US012792880B2

United States Patent

(12) United States Patent
K S et al.

(10) Patent No.: US 12,792,880 B2
(45) Date of Patent: Nov. 10, 2026

(54) METHODS AND SYSTEMS FOR LOW LIGHT MEDIA ENHANCEMENT

(71) Applicant: SAMSUNG ELECTRONICS CO., LTD., Suwon-si (KR)

(72) Inventors: Green Rosh K S, Bengaluru (IN); Nikhil Krishnan, Bengaluru (IN); Yash Harbhajanka, Bengaluru (IN); Bodhisatwa Mandal, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 506 days.

(21) Appl. No.: 17/889,988

(22) Filed: Aug. 17, 2022

(65) Prior Publication Data

US 2022/0398700 A1 Dec. 15, 2022

Related U.S. Application Data

(63) Continuation of application No. PCT/KR2022/008294, filed on Jun. 13, 2022.

(30) Foreign Application Priority Data

Jun. 15, 2021 (IN) ............................ 202141026673
Apr. 11, 2022 (IN) ............................ 2021 41026673

(51) Int. Cl.
*G06N 3/045* (2023.01)
*G06T 5/60* (2024.01)
(Continued)

(52) U.S. Cl.
CPC ............... *G06N 3/045* (2023.01); *G06T 5/60* (2024.01); *G06T 5/70* (2024.01); *G06T 5/80* (2024.01);
(Continued)

(58) Field of Classification Search
CPC .... G06T 5/80; G06T 5/70; G06T 7/13; G06T 2207/20081; G06T 2207/20084;
(Continued)

(56) References Cited

U.S. PATENT DOCUMENTS 7,123,769 B2 10/2006 Xiong
7,551,800 B2 6/2009 Corcoran et al.
(Continued)

FOREIGN PATENT DOCUMENTS

CN 1856030 A 11/2006
CN 110728643 A 1/2020
(Continued)

OTHER PUBLICATIONS

Seeing Motion in the Dark, by Chen Chen, Qifeng Chen, Minh Do, Vladlen Koltun, 2019 IEEE/CVF International Conference on Computer Vision (ICCV) (2019, pp. 3184-3193), Oct. 1, 2019 (Year: 2019).*
(Continued)

*Primary Examiner* — Jennifer Mehmood
*Assistant Examiner* — Heath E. Wells
(74) *Attorney, Agent, or Firm* — Sughrue Mion, PLLC

(57) ABSTRACT

A method for enhancing media includes: receiving, by an electronic device, a media stream; performing, by the electronic device, an alignment of a plurality of frames of the media stream; correcting, by the electronic device, a brightness of the plurality of frames; selecting, by the electronic device, one of a first neural network, a second neural network, or a third neural network, by analyzing parameters of the plurality of frames having the corrected brightness, wherein the parameters include at least one of shot boundary detection and artificial light flickering; and generating, by the electronic device, an output media stream by processing the plurality of frames of the media stream using the selected
(Continued)

one of the first neural network, the second neural network, or the third neural network.

15 Claims, 20 Drawing Sheets

(51) Int. Cl.

| | |
|---|---|
| ***G06T 5/70*** | (2024.01) |
| ***G06T 5/80*** | (2024.01) |
| ***G06T 7/13*** | (2017.01) |
| ***G06V 10/774*** | (2022.01) |
| ***G06V 10/776*** | (2022.01) |
| ***G06V 10/82*** | (2022.01) |
| ***H04N 23/71*** | (2023.01) |
| ***H04N 23/745*** | (2023.01) |

(52) U.S. Cl.
CPC ............ *G06T 7/13* (2017.01); *G06V 10/7747* (2022.01); *G06V 10/776* (2022.01); *G06V 10/82* (2022.01); *H04N 23/71* (2023.01); *H04N 23/745* (2023.01); *G06T 2207/20081* (2013.01); *G06T 2207/20084* (2013.01); *G06T 2207/30168* (2013.01); *G06V 2201/10* (2022.01)

(58) Field of Classification Search
CPC ............. G06T 2207/30168; G06T 5/60; G06T 2207/10016; G06V 10/7747; G06V 10/776; G06V 10/82; G06V 2201/10; H04N 23/71; H04N 23/745; H04N 9/646; G06N 3/0464; G06N 3/09; G06N 3/045
USPC .......................................................... 382/157
See application file for complete search history.

(56) References Cited

U.S. PATENT DOCUMENTS

| | | | | |
|---|---|---|---|---|
| 7,589,763 | B2 | 9/2009 | Ono et al. | |
| 8,891,021 | B2 * | 11/2014 | Li | G06V 20/40 348/712 |
| 9,137,417 | B2 | 9/2015 | Macciola et al. | |
| 9,939,712 | B2 | 4/2018 | Furuta | |
| 9,979,897 | B2 | 5/2018 | Prinet et al. | |
| 10,964,000 | B2 | 3/2021 | Oh et al. | |
| 2003/0091235 | A1 * | 5/2003 | Xiong | G06F 16/785 382/199 |
| 2007/0286523 | A1 * | 12/2007 | Kim | G06T 5/50 382/274 |
| 2011/0096179 | A1 | 4/2011 | Border et al. | |
| 2016/0217338 | A1 | 7/2016 | Li | |
| 2017/0353650 | A1 * | 12/2017 | Prinet | G06V 10/443 |
| 2019/0139205 | A1 * | 5/2019 | El-Khamy | G06T 3/4053 |
| 2019/0304067 | A1 | 10/2019 | Vogels et al. | |
| 2019/0304068 | A1 * | 10/2019 | Vogels | G06T 5/70 |
| 2020/0234080 | A1 | 7/2020 | Ciller Ruiz et al. | |
| 2020/0285883 | A1 | 9/2020 | Hiasa | |
| 2020/0401856 | A1 * | 12/2020 | Kim | G06V 10/776 |
| 2021/0097646 | A1 * | 4/2021 | Choi | G06N 3/08 |
| 2021/0133943 | A1 * | 5/2021 | Lee | G06T 5/60 |
| 2022/0121878 | A1 * | 4/2022 | Butler | G06V 10/751 |
| 2022/0232157 | A1 * | 7/2022 | Miyatani | H10F 39/806 |

FOREIGN PATENT DOCUMENTS

| | | | | |
|---|---|---|---|---|
| CN | 111311524 | A | 6/2020 | |
| EP | 3790272 | A1 | 3/2021 | |
| JP | 2019-205073 | A | 11/2019 | |
| KR | 10-2019-0135888 | A | 12/2019 | |
| KR | 10-2134405 | B1 | 7/2020 | |
| WO | WO-2020246861 | A1 * | 12/2020 | G06K 9/6256 |

OTHER PUBLICATIONS

An image-to-class dynamic time warping approach for both 3D static and trajectory hand gesture recognition, by Hong Cheng, Zhongjun Dai, Zicheng Liu, Yang Zhao, http://dx.doi.org/10.1016/j.patcog.2016.01.011, ICME, Feb. 3, 2016 (Year: 2016).*
Nan Zhang et al., "BPNN algorithm towards shot boundary detection", Journal of Computer Applications, 2009, vol. 29, No. 5, pp. 1369-1372, DOI:10.3724/SP.J.1087.2009.01369.
Communication issued by the Indian Patent Office on Apr. 26, 2023 for Indian Patent Application No. 202141026673.
Communication issued Aug. 8, 2023 by the European Patent Office in European Patent Application No. 22825246.6.
Communication issued Nov. 30, 2023 by the European Patent Office in European Patent Application No. 22825246.6.
International Search Report (PCT/ISA/210) dated Sep. 23, 2022 issued by the International Searching Authority in International Application No. PCT/KR2022/008294.
Written Opinion (PCT/ISA/237) dated Sep. 23, 2022 issued by the International Searching Authority in International Application No. PCT/KR2022/008294.
Communication dated Mar. 13, 2026 issued by the European Patent Office in European Patent Application No. 22825246.6.
Communication dated Apr. 1, 2026 issued by the China National Intellectual Property Administration in Chinese Patent Application No. 202280018046.9.
Office Action issued on Aug. 6, 2026 by the National Intellectual Property Administration of P.R. China in Chinese Patent Application No. 202280018046.9.

* cited by examiner

METHODS AND SYSTEMS FOR LOW LIGHT MEDIA ENHANCEMENT

CROSS-REFERENCE TO RELATED APPLICATIONS

This application is a continuation application of International Application No. PCT/KR2022/008294, filed on Jun. 13, 2022, which is based on and priority to Indian Provisional Patent Application No. 202141026673, filed on Jun. 15, 2021, in the Indian Intellectual Property Office, and of Indian Complete Patent Application No. 202141026673, filed on Apr. 11, 2022, in the Indian Intellectual Property Office, the disclosures of which are incorporated by reference herein in its entireties.

BACKGROUND

1. Field

The disclosure relates to the field of media processing and more particularly to low light media enhancement.

2. Description of Related Art

Videos captured under low light conditions or captured using low quality sensors may suffer from various issues:

- high noise: a maximum exposure time of the videos may be restricted by a desired frame per second (FPS), which results in high noise in the low light conditions;
- low brightness: in the low light conditions, a lack of sufficient ambient light results in a dark video;
- color artifacts: an accuracy of the sensor used to capture accurate color drops with a decrease in a number of photons captured resulting in a loss of color accuracy;
- obtaining a good output quality by performing a low complexity Artificial Intelligence (AI) video processing (full HD-30FPS) is difficult;
- power and memory constraints to handle long duration video capture;
- flickering due to temporal consistency issues; and
- lack of real-world dataset for training.

In related art methods, spatial or temporal filters may be used to denoise/enhance the video captured under the low light conditions. However, the spatial or temporal filters may not remove noise from the video efficiently, when the video is captured under the low light conditions or using the low-quality sensors.

In some of related art methods, deep Convolutional Neural Networks (CNNs) may be used to enhance the video. However, the deep CNNs used in the related art methods may be too computationally heavy and memory intensive to be deployed in a real-time on an electronic device/mobile phone. The enhanced video using the deep CNNs may also suffer from the flickering due to inconsistent denoising of consecutive video frames.

SUMMARY

Provided are methods and systems for enhancing media captured under low light conditions and using inferior sensors.

Another aspect of the embodiments herein is to provide methods and systems for switching between a first, second, and third neural network to enhance the media, by analyzing parameters of a plurality of frames of the video, wherein the parameters include shot boundary detection and artificial light flickering, wherein the first neural network is a high complexity neural network (HCN) with one input frame, the second neural network is a temporally guided lower complexity neural network (TG-LCN) with a 'q' number of input frames and a previous output frame for joint deflickering or joint denoising, and the third neural network is a neural network with a 'p' number of input frames and the previous output frame for denoising, wherein 'p' is lesser than 'q'.

Another aspect of the embodiments herein is to provide methods and systems for training the first/second/third neural network using a multi-frame Siamese training method.

According to an aspect of the disclosure, a method for enhancing media includes: receiving, by an electronic device, a media stream; performing, by the electronic device, an alignment of a plurality of frames of the media stream; correcting, by the electronic device, a brightness of the plurality of frames; selecting, by the electronic device, one of a first neural network, a second neural network, or a third neural network, by analyzing parameters of the plurality of frames having the corrected brightness, wherein the parameters include at least one of shot boundary detection and artificial light flickering; and generating, by the electronic device, an output media stream by processing the plurality of frames of the media stream using the selected one of the first neural network, the second neural network, or the third neural network.

The media stream may be captured under low light conditions, and the media stream may include at least one of noise, low brightness, artificial flickering, and color artifacts.

The output media stream may be a denoised media stream with enhanced brightness and zero flicker.

The correcting the brightness of the plurality of frames of the media stream may include: identifying a single frame or the plurality of frames of the media stream as an input frame; linearizing the input frame using an Inverse Camera Response Function (ICRF); selecting a brightness multiplication factor for correcting the brightness of the input frame using a future temporal guidance; applying a linear boost on the input frame based on the brightness multiplication factor; and applying a Camera Response Function (CRF) on the input frame to correct the brightness of the input frame, wherein the CRF is a function of a sensor type and metadata, wherein the metadata includes an exposure value and International Standard Organization (ISO), and the CRF and the ICRF are stored as Look-up-tables (LUTs).

The selecting the brightness multiplication factor may include: analyzing the brightness of the input frame; identifying a maximum constant boost value as the brightness multiplication factor, based on the brightness of the input frame being less than a threshold and a brightness of all frames in a future temporal buffer being less than the threshold; identifying a boost value of monotonically decreasing function between maximum constant boost value and 1 as the brightness multiplication factor, based on the brightness of the input frame being less than the threshold, and the brightness of all the frames in the future temporal buffer being greater than the threshold; identifying a unit gain boost value as the brightness multiplication factor, based on the brightness of the input frame being greater than the threshold and the brightness of all the frames in the future temporal buffer being greater than the threshold; and identifying a boost value of monotonically increasing function between 1 and the maximum constant boost value as the brightness multiplication factor, based on the brightness of the input frame being greater than the threshold, and the brightness of the frames in the future temporal buffer being less than the threshold.

The selecting, by the electronic device, one of the first neural network, the second neural network or the third neural network may include: analyzing each frame with respect to earlier frames to determine whether the shot boundary detection is associated with each of the plurality of frames; selecting the first neural network for generating the output media stream by processing the plurality of frames of the media stream, based on the shot boundary detection being associated with the plurality of frames; analyzing a presence of the artificial light flickering in the plurality of frames, based on the shot boundary detection not being associated with the plurality of frames; selecting the second neural network for generating the output media stream by processing the plurality of frames of the media stream, based on the artificial light flickering being present in the plurality of frames; and selecting the third neural network for generating the output media stream by processing the plurality of frames of the media stream, based on the artificial light flickering not being present in the plurality of frames.

The first neural network may be a high complexity neural network with one input frame, the second neural network may be a temporally guided lower complexity neural network with ‘q’ number of input frames and a previous output frame for joint deflickering or joint denoising.

The third neural network may be a neural network with ‘p’ number of input frames and the previous output frame for denoising, wherein ‘p’ is less than ‘q’.

The first neural network may include multiple residual blocks at a lowest level for enhancing noise removal capabilities, and the second neural network may include at least one convolution operation with less feature maps and the previous output frame as a guide for processing the plurality of input frames.

The first neural network, the second neural network and the third neural network may be trained using a multi-frame Siamese training method to generate the output media stream by processing the plurality of frames of the media stream.

The method may further include training a neural network of at least one of the first neural network, the second neural network and the third neural network by: creating a dataset for training the neural network, wherein the dataset includes one of a local dataset and a global dataset; selecting at least two sets of frames from the created dataset, wherein each set includes at least three frames; adding a synthetic motion to the selected at least two sets of frames, wherein the at least two sets of frames added with the synthetic motion include different noise realizations; and performing a Siamese training of the neural network using a ground truth media and the at least two sets of frames added with the synthetic motion.

The creating the dataset may include: capturing burst datasets, wherein a burst dataset includes one of low light static media with noise inputs and a clean ground truth frame; simulating a global motion and a local motion of each burst dataset using a synthetic trajectory generation and a synthetic stop motion, respectively; removing at least one burst dataset with structural and brightness mismatches between the clean ground truth frame and the low light static media; and creating the dataset by including the at least one burst dataset that does not include the structural and brightness mismatches between the clean ground truth frame and the low light static media.

The simulating the global motion of each burst dataset may include: estimating a polynomial coefficient range based on parameters including a maximum translation and a maximum rotation; generating 3rd order polynomial trajectories using the estimated polynomial coefficient range; approximating a 3rd order trajectory using a maximum depth and the generated 3rd order polynomial trajectories; generating uniform sample points based on a pre-defined sampling rate and the approximated 3rd order trajectory; generating ‘n’ affine transformations based on the generated uniform sample points; and applying the generated n affine transformations on each burst dataset.

The simulating the local motion of each burst dataset includes: capturing local object motion from each burst dataset in a static scene using the synthetic stop motion, the capturing the local object motion including: capturing an input and ground truth scene with a background scene; capturing an input and ground truth scene with a foreground object; cropping out the foreground object; and creating synthetic scenes by positioning the foreground object at different locations of the background scene; and simulating a motion blur for each local object motion by averaging a pre-defined number of frames of the burst dataset.

The performing the Siamese training of the neural network may include: passing the at least two sets of frames with the different noise realizations to the neural network to generate at least two sets of output frames; computing a Siamese loss by computing a loss between the at least two sets of output frames; computing a pixel loss by computing an average of the at least two sets of output frames and a ground truth; computing a total loss using the Siamese loss and the pixel loss; and training the neural network using the computed total loss.

According to an aspect of the disclosure, an electronic device includes: a memory; and a processor coupled to the memory and configured to: receive a media stream; perform an alignment of a plurality of frames of the media stream; correct a brightness of the plurality of frames; select one of a first neural network, a second neural network, or a third neural network, by analyzing parameters of the plurality of frames having the corrected brightness, wherein the parameters include at least one of shot boundary detection, and artificial light flickering; and generate an output media stream by processing the plurality of frames of the media stream using the selected one of the first neural network, the second neural network, or the third neural network.

BRIEF DESCRIPTION OF THE DRAWINGS

The above and other aspects, features, and advantages of certain embodiments of the present disclosure will be more apparent from the following description taken in conjunction with the accompanying drawings, in which:.

DETAILED DESCRIPTION

Figure 1:
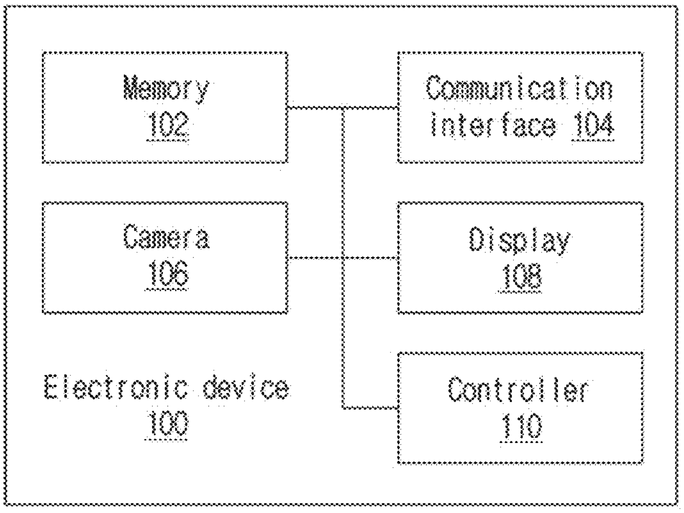
FIG. 1 illustrates an electronic device for enhancing media, according to embodiments of the disclosure.

The example embodiments and the various aspects, features and advantageous details thereof are explained more fully with reference to the accompanying drawings in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the embodiments.

Embodiments of the disclosure provide methods and systems for enhancing media/video in real-time using temporal guided adaptive Convolutional Neural Network (CNN) switching, wherein the media may be captured in extreme low light conditions, under high noise conditions, and/or captured using inferior/low quality sensors.

Further, embodiments of the disclosure provide methods and systems for using a deep learning based pipeline to enhance the media while minimizing noise and flicker artifacts.

Further still, embodiments of the disclosure provide methods and systems for choosing between high and low complexity networks by analyzing temporal consistency of input frames of the media, thus reducing average time and power required to process the media.

Further still, embodiments of the disclosure provide methods and systems for using a Siamese training method to reduce the flicker.

Embodiments of the disclosure will now be described with reference to the drawings, where similar reference characters denote similar features.

FIG. 1 illustrates an electronic device 100 for enhancing media, according to embodiments of the disclosure. The electronic device 100 referred herein may be configured to enhance media.

Examples of the electronic device 100 may be, but are not limited to, a cloud computing device (which may be a part of a public cloud or a private cloud), a server, a database, a computing device, and so on. The server may be at least one of a standalone server, a server on a cloud, or the like. The computing device may be, but is not limited to, a personal computer, a notebook, a tablet, desktop computer, a laptop, a handheld device, a mobile device, a camera, an Internet of Things (IoT) device, an Augmented Reality (AR)/Virtual Reality (VR) device, and so on. Also, the electronic device 100 may be at least one of, a microcontroller, a processor, a System on Chip (SoC), an integrated chip (IC), a microprocessor based programmable consumer electronic device, and so on.

Examples of the media/media stream may be, but are not limited to, video, animated images, Graphic Interchange Formats (GIFs), a batch of moving images, and so on. In an example, the video may include a low frame per second (FPS) video, an indoor slow motion video, a High Dynamic Range (HDR) video, and so on. In an example, the media may be captured under low light conditions. In another example, the media may be captured using inferior/low quality sensors. In an example, the media may include, but is not limited to, at least one of noise, low brightness, artificial light, flickering, color artifacts, and so on. Embodiments herein use the terms such as "media", "video", "media stream", "video stream", "image frames", and so on, interchangeably throughout the disclosure.

The electronic device 100 may enhance the media/media stream stored in a memory or received from at least one external device. Alternatively, the electronic device 100 may enhance the media being captured in real-time. Enhancing the media refers to denoising the media and removing the different artifacts (such as, the artificial light flickering, the color artifacts, and so on) from the media.

The electronic device 100 includes a memory 102, a communication interface 104, a camera (camera sensor) 106, a display 108, and a controller (processor) 110. The electronic device 100 may also communicate with one or more external devices using a communication network to receive the media for enhancing. Examples of the external devices may be, but are not limited to, a server, a database, and so on. The communication network may include, but is not limited to, at least one of a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

The memory 102 may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, and/or an optical disk.

The memory 102 may store at least one of the media, an input media stream received for enhancing, an output media stream (i.e., the enhanced media stream), and so on.

The memory 102 may also store a first neural network 202*a*, a second neural network 202*b*, and a third neural network 202*c*, which may be used to generate the output media stream by processing the input media stream. In an embodiment, the first neural network 202*a* may be a high complexity neural network (HCN) with one input frame of the media. In an embodiment, the second neural network 202*b* may be a temporally guided lower complexity neural network (TG-LCN) with 'q' number of input frames and a previous output frame for joint deflickering or joint denoising. In an embodiment, the third neural network 202*c* may be a neural network with 'p' number of input frames and the previous output frame for denoising, wherein 'p' is less than 'q'. Each neural network is described later.

Examples of the first, second, and third neural networks (202*a*, 202*b*, and 202*c*) may be, but are not limited to, a deep neural network (DNN), an Artificial Intelligence (AI) model, a machine learning (ML) model, a multi-class Support Vector Machine (SVM) model, a Convolutional Neural Network (CNN) model, a recurrent neural network (RNN), a stacked hourglass network, a restricted Boltzmann Machine (RBM), a deep belief network (DBN), a bidirectional recurrent deep neural network (BRDNN), a generative adversarial network (GAN), a regression based neural network, a deep reinforcement model (with ReLU activation), a deep Q-network, a residual network, a Conditional Generative Adversarial Network (CGAN), and so on.

The first, second, and third neural networks (202*a*, 202*b*, and 202*c*) may include a plurality of nodes, which may be arranged in the layers. Examples of the layers may be, but are not limited to, a convolutional layer, an activation layer, an average pool layer, a max pool layer, a concatenated layer, a dropout layer, a fully connected (FC) layer, a SoftMax layer, and so on. Each layer has a plurality of weight values and performs a layer operation through calculation of a previous layer and an operation of a plurality of weights/coefficients. A topology of the layers of the first, second, and third neural networks (202*a*, 202*b*, and 202*c*) may vary based on the type of the respective network. In an example, the first, second, and third neural networks (202*a*, 202*b*, and 202*c*) may include an input layer, an output layer, and a hidden layer. The input layer receives a layer input and forwards the received layer input to the hidden layer. The hidden layer transforms the layer input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The first, second, and third neural networks (202*a*, 202*b*, and 202*c*) may be trained using at least one learning method to perform at least one intended function. Examples of the learning method may be, but are not limited to, supervised learning, unsupervised learning, semi-supervised learning, reinforcement learning, regression-based learning, and so on. The trained first, second, and third neural networks (202*a*, 202*b*, and 202*c*) may be a neural network model in which a number of layers, a sequence for processing the layers and parameters related to each layer may be known and fixed for performing the at least one intended function. Examples of the parameters related to each layer may be, but are not limited to, activation functions, biases, input weights, output weights, and so on, related to the layers of the first, second, and third neural networks (202*a*, 202*b*, and 202*c*). A function associated with the learning method may be performed through the non-volatile memory, the volatile memory, and the controller 110. The controller 110 may include one or more processors. At this time, the one or more processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or more processors may perform the at least one intended function in accordance with a predefined operating rule of the first, second, and third neural networks (202*a*, 202*b*, and 202*c*), stored in the non-volatile memory and the volatile memory. The predefined operating rules of the first, second, and third neural networks (202*a*, 202*b*, and 202*c*) are provided through training the modules using the learning method.

Herein, being provided through learning means that, by applying the learning method to a plurality of learning data, a predefined operating rule, or the first, second, and third neural networks (202*a*, 202*b*, and 202*c*) of a desired characteristic is made. The intended functions of the first, second, and third neural networks (202*a*, 202*b*, and 202*c*) may be performed in the electronic device 100 itself in which the learning according to an embodiment is performed, and/or may be implemented through a separate server/system.

The communication interface 104 may be configured to communicate with the one or more external devices using communication methods that have been supported by the communication network. The communication interface 104 may include the components such as, a wired communicator, a short-range communicator, a mobile/wireless communicator, and a broadcasting receiver. The wired communicator may enable the electronic device 100 to communicate with the external devices using the communication methods such as, but are not limited to, wired LAN, the Ethernet, and so on. The short-range communicator may enable the electronic device 100 to communicate with the external devices using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transceive wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 100 may or may not include the broadcasting receiver.

The camera sensor 106 may be configured to capture the media.

The display 108 may be configured to enable a user to interact with the electronic device 100. The display 108 may also be configured to display the output media stream to the user.

The controller 110 may be configured to enhance the media/media stream in real-time. In an embodiment, the controller 110 may enhance the media using a temporal guided adaptive neural network/CNN switching. The temporal guided adaptive neural network switching refers to switching between the first, second, and third neural networks (202*a*-202*c*) to enhance the media.

For enhancing the media stream, the controller 110 receives the media stream. In an example, the controller 110 may receive the media stream from the memory 102. In another example, the controller 110 may receive the media stream from the external device. In another example, the controller 110 may receive the media stream from the camera 106. Embodiments herein use the terms such as "media", "media stream", "input media stream", "input video", "input video frames", "input video sequence" and so on, interchangeably to refer to media captured under the low light conditions or using the low quality sensors.

When the media stream is received, the controller 110 performs an alignment of a plurality of frames of the media stream. In an example, the plurality of frames may correspond to a plurality of image frames.

After aligning the plurality of frames of the media stream, the controller 110 corrects brightness of the plurality of frames. For correcting the plurality of frames, the controller 110 identifies a single frame of the plurality of frames or the plurality of frames of the media stream as an input frame. The controller 110 linearizes the input frames using an Inverse Camera Response Function (ICRF). The controller 110 chooses a brightness value for correcting the brightness of the input frame using a future temporal guidance, on linearizing the input frames. For choosing the brightness value in accordance with the future temporal guidance, the controller 110 analyzes the brightness of the input frame and a future temporal buffer. The future temporal buffer is the next n frames after the input frame. For example, the current input frame will be the (t-n)th frame, and the frames from (t-n) to t comprise of future temporal buffer(s). There may be a delay of n frames between the camera stream and output. The controller 110 chooses a constant boost value as the brightness value, on analyzing that the brightness of the input frame is less than a threshold and brightness of all frames in the future temporal buffer is less than the threshold. In an embodiment, the threshold value can be set empirically after experiments. The controller 110 chooses a boost value of monotonically decreasing function as the brightness value, based on analyzing that the brightness of the input frame is less than the threshold and the brightness of all the frames in the future temporal buffer is greater than the threshold. The controller 110 chooses a zero-boost value as the brightness value, based on analyzing that the brightness of the input frame is greater than the threshold and the brightness of all the frames in the future temporal buffer is greater than the threshold. Thereby, the controller 110 does not boost the brightness of the input frame, based on choosing the zero boost value. The controller 110 chooses a boost value of monotonically increasing function as the brightness value, based on analyzing that the brightness of the input frame is greater than the threshold, and the brightness of the frames in the future temporal buffer is less than the threshold. After choosing the brightness value, the controller 110 applies a linear boost on the input frame based on the chosen brightness value. The controller 110 applies a Camera Response Function (CRF) on the input frame to correct the brightness of the input frame. The CRF may be a function of a type of the camera 106 used to capture the media stream (hereinafter referred as a sensor type) and metadata. The metadata includes an exposure value and International Standard Organization (ISO). The CRF and the ICRF may be characterized and stored in Look-up-tables (LUTs).

After correcting the brightness of the plurality of frames of the media stream, the controller 110 selects one of the first neural network 202*a*, the second neural network 202*b*, and the third neural network 202*c* for processing the media stream. The controller 110 selects one of the three neural networks (202*a*, 202*b*, and 202*c*) by analyzing parameters of the plurality of frames of the media stream. Examples of the parameters may be, but are not limited to, shot boundary detection, and artificial light flickering.

For selecting one among the three neural networks (202*a*, 202*b*, and 202*c*) for processing the plurality of frames of the media stream, the controller 110 analyzes each frame with respect to earlier frames to check if the shot boundary detection is associated with each of the plurality of frames. The shot boundary detection may be checked by analyzing temporal similarity between the plurality of frames. The controller 110 may analyze that the shot boundary detection is associated with each of the plurality of frames based on an absence of the temporal similarity between the plurality of frames. If the shot boundary detection is associated with the plurality of frames, the controller 110 selects the first neural network 202*a* for processing the plurality of frames of the media stream. If the shot boundary detection is not associated with the plurality of frames, the controller 110 analyzes a presence of the artificial light flickering in the plurality of frames. If the artificial light flickering is present in the plurality of frames, the controller 110 selects the second neural network 202*b* for processing the plurality of frames of the media stream. If the artificial light flickering is not present in the plurality of frames, the controller 110 selects the third neural network 202*c* for processing the plurality of frames of the media stream.

In an embodiment, the first neural network 202*a* may be the high complexity network (HCN) with one input frame (current frame) of the media. The first neural network 202*a* includes multiple residual blocks at lowest level for enhancing noise removal capabilities. Embodiments herein use the terms such as "first neural network", "HCN", "high complexity CNN", and so on, interchangeably throughout the disclosure.

In an embodiment, the second neural network 202*b* may be the temporally guided lower complexity neural network (TG-LCN) with the 'q' number of input frames and the previous output frame for joint deflickering or joint denoising. The second neural network 202*b* includes at least one convolution operation with less feature maps and a previous output frame as a guide for processing the plurality of input frames. Embodiments herein use the terms such as "second neural network", "TG-LCN (n=q)," "TG-LCN", "'q' frame flicker reduction denoiser", and so on, interchangeably throughout the disclosure.

In an embodiment, the third neural network 202*c* may be the neural network with the 'p' number of input frames and the previous output frame for denoising, wherein the 'p' is less than the 'q' (i.e., the number of frames of the media stream). In an example, consider that the media stream may include 5 frames (i.e., 'q'=5). In such a scenario, 'p' may be equal to 3 number of frames (i.e., 'p'=3). Embodiments herein use the terms such as "third neural network", "TG-LCN (n=p, p<q)", "TG-LCN (n=p)", and so on, interchangeably throughout the disclosure.

The first, second, and third neural networks (202*a*, 202*b*, and 202*c*) may be the trained neural network. In an embodiment, the controller 110 may train the first, second, and third neural networks (202*a*, 202*b*, and 202*c*) using a multi-frame Siamese training method.

For training the first, second, and third neural networks (202*a*, 202*b*, and 202*c*), the controller 110 creates a dataset. The dataset includes one of a local dataset and a global dataset.

For creating the dataset, the controller 110 captures burst datasets, or alternatively, the controller 110 may receive the burst dataset from the external devices. The burst datasets includes, but is not limited to, one of low light static media with noise inputs and a clean ground truth frame, or the like. The clean ground truth means ground truth image without noise. The clean ground truth can be obtained by averaging the individual frames in the burst. After capturing the burst dataset, the controller 110 simulates a global motion and a local motion of each burst dataset using a synthetic trajectory generation and a synthetic stop motion, respectively. For simulating the global motion of each burst dataset, the controller 110 estimates a polynomial coefficient range based on parameters including a maximum translation and a maximum rotation from the burst dataset. The maximum translation and rotation signify the maximum motion that the camera can undergo during a capture session. This can be used for creating synthetic motion, and can be set empirically after experiments. The controller 110 generates a 3rd order polynomial trajectory using the estimated polynomial coefficient range and approximates the 3rd order trajectory using a maximum depth. The maximum depth determines the distance of the scene from the camera for approximately planar scenes. The maximum depth can be set empirically after experiments. In an example herein, the 3rd order polynomial trajectory may be a trajectory used by the camera 106 to capture the burst dataset. The controller 110 generates the uniform sample points based on a pre-defined sampling rate and the approximated 3rd order trajectory. The pre-defined sampling rate may be a sampling rate that controls a smoothness between the frames of each burst dataset. The controller 110 generates 'n' affine transformations based on the generated uniform sample points and applies the generated 'n' affine transformations on each burst dataset. Thereby, creating the global dataset by simulating the global motion of each burst dataset. For simulating the local motion of each burst dataset, the controller 110 captures a local object motion from each burst dataset in a static scene using the synthetic stop motion, For capturing the local object motion, the controller 110 captures an input and ground truth scene with a background scene from each burst dataset. The controller 110 also captures an input and ground truth scene with a foreground object from each burst dataset. The controller 110 crops out the foreground object and creates synthetic scenes by positioning the foreground object at different locations of the background scene. On capturing the local object motion, the controller 110 simulates a motion blur for each local object motion by averaging a pre-defined number of frames of the burst dataset. Thereby, creating the local dataset by simulating the local motion of each burst dataset. After simulating the global motion and the local motion of each burst dataset, the controller 110 removes one or more burst datasets having structural and brightness mismatches between the clean ground truth frame and the low light static media. The controller 110 creates the dataset by including the one or more burst datasets that do not include the structural and brightness mismatches between the clean ground truth frame and the low light static media.

After creating the dataset, the controller 110 selects at least two sets of frames from the created dataset. Each set includes at least three frames. The controller 110 adds a synthetic motion to the selected at least two sets of frames. The at least two sets of frames added with the synthetic motion includes different noise realizations. The controller 110 performs a Siamese training of the first, second, and third neural networks (202*a*, 202*b*, and 202*c*) using a ground truth and the at least two sets of frames added with the synthetic motion. The ground truth can be used for loss computations for training the neural network. For performing the Siamese training of the first, second, and third neural networks (202*a*, 202*b*, and 202*c*), the controller 110 passes the at least two sets of frames with the different noise realizations to at least two of the first, second, and third neural networks (202*a*, 202*b*, and 202*c*) to generate at least two sets of output frames. The controller 110 computes a Siamese loss by computing a L2 loss between the at least two sets of output frames. The controller 110 computes a pixel loss by computing an average of the at least two sets of output frames and a ground truth corresponding to the output frames. The controller 110 computes a total loss using the Siamese loss and the pixel loss and trains the first, second, and third neural networks (202*a*, 202*b*, and 202*c*) using the computed total loss.

After selecting the neural network among the first, second, and third neural networks (202*a*, 202*b*, and 202*c*), the controller 110 generates the output media stream by processing the plurality of frames of the media stream using the selected neural network (202*a*, 202*b*, or 202*c*). The output media stream may be a denoised media stream with enhanced brightness and zero flicker. Embodiments herein use the terms such as "output media stream", "output", "output video stream", "output video frames", "output image frames", "denoised media/video", "enhanced media/video", and so on, interchangeably to refer to media including zero noise and zero artificial flickering (i.e., including zero artifacts), and the corrected brightness.

For generating the output media stream, the controller 110 selects the single or the plurality of frames of the media stream as an input processing frame. The controller 110 down samples the input processing frame over multiple scales to generate a low-resolution input. In an example herein, the controller 110 down samples the input processing frame for 2 times. On generating the lower resolution input, the controller 110 processes the low-resolution input using the selected one of the first neural network 202*a*, the second neural network 202*b*, or the third neural network 202*c* at a lower resolution to generate a low-resolution output. The controller 110 then upscales the processed low-resolution output over multiple scales to generate the output media stream. For example, the controller 110 upscales the low-resolution output for 2 times. A number of scales for which the down sampling has been performed may be equal to a number of scales for which the upscaling has been performed.

The controller 110 may be further configured to dynamically vary a complexity of the selected one of first neural network 202*a*, the second neural network 202*b*, or the third neural network 202*c* by changing a number of scales for processing the low-resolution input. The complexity of the selected one of the first neural network 202*a*, the second neural network 202*b*, or the third neural network 202*c* may be varied with an inverse relationship with respect to the number of frames of the media stream.

The controller 110 saves/stores the generated output media stream in the memory 102.

Figure 2:
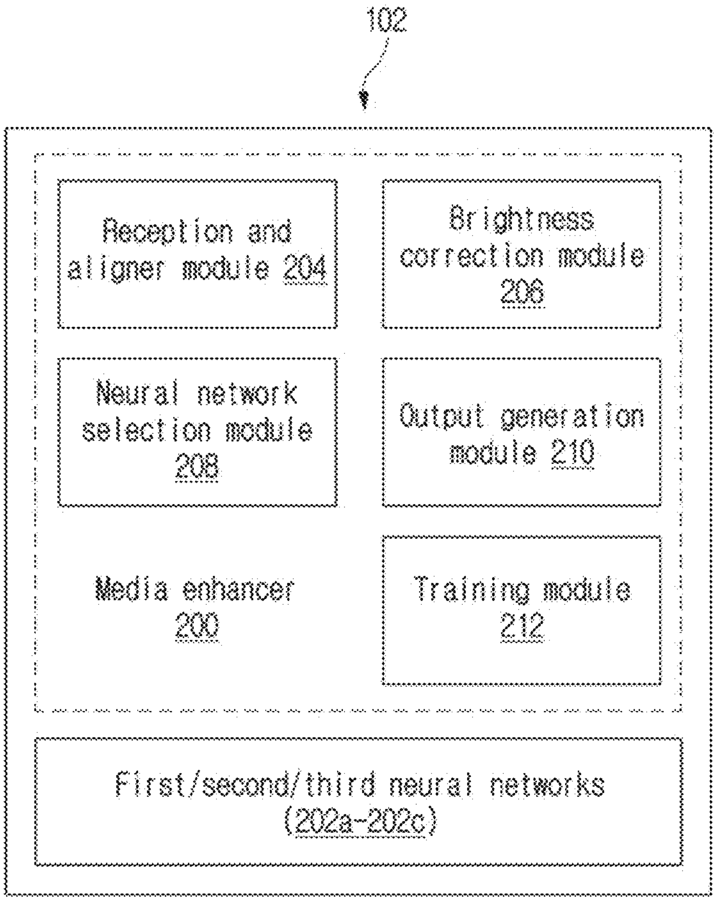
FIG. 2 illustrates a media enhancer performable in the electronic device for enhancing the media, according to embodiments of the disclosure.

FIG. 2 illustrates a media enhancer 200 performable in the electronic device 100 for enhancing the media, according to embodiments of the disclosure. The media enhancer 200 may be stored in the memory 102 and processed/executed by the controller 110 of the electronic device 100 to enhance the media/media stream. The media enhancer 200 includes a reception and aligner module 204, a brightness correction module 206, a neural network selection module 208, an output generation module 210, and a training module 212.

The reception and aligner module 204 may be configured to receive the media stream/input media for enhancing and performs the alignment of the plurality of frames of the media stream.

The brightness correction module 206 may be configured to correct the brightness of the plurality of frames of the media stream. The brightness correction module 206 identifies the single frame or the plurality of frames of the media stream as the input frame. The brightness correction module 206 linearizes the input frame using the ICRF and chooses the brightness value for correcting the brightness of the input frame using the future temporal guidance. After choosing the brightness value, the brightness correction module 206 applies the linear boost on the input frame based on the chosen brightness value. The brightness correction module 206 applies the CRF on the input frame to correct the brightness of the input frame.

The neural network selection module 208 may be configured to select one among the first, second, and third neural networks (202*a*, 202*b*, and 202*c*) for processing the plurality of frames of the media stream. For selecting the neural network (202*a*, 202*b*, or 202*c*), the neural network selection module 208 analyzes each frame with respect to earlier frames to check if the shot boundary detection is associated with each of the plurality of frames. If the shot boundary detection is associated with the plurality of frames, the controller 110 selects the first neural network 202*a* for processing the plurality of frames of the media stream. If the shot boundary detection is not associated with the plurality of frames, the controller 110 analyzes the presence of the artificial light flickering in the plurality of frames of the media stream. If the artificial light flickering is present in the plurality of frames, the controller 110 selects the second neural network 202*b* for processing the plurality of frames of the media stream. If the artificial light flickering is not present in the plurality of frames, the controller 110 selects the third neural network 202*c* for processing the plurality of frames of the media stream.

The output generation module 210 may be configured to generate the output media stream by processing the plurality of frames of the media stream using the selected first neural network 202*a*, or the second neural network 202*b*, or the third neural network 202*c*. The output generation module 210 selects the single or the plurality of frames of the media stream as the input processing frame. The output generation module 210 down samples the input processing frame over the multiple scales to generate the low-resolution input. The output generation module 210 processes the low-resolution input using the selected first neural network 202*a*, or the second neural network 202*b*, or the third neural network 202*c*. The output generation module 210 upscales the low-resolution output over the multiple scales using the higher resolution frames as the guide to generate the output media stream.

The training module 212 may be configured to train the first, second, and third neural networks (202*a*, 202*b*, and 202*c*) using the multi-frame Siamese training method. For training the first, second, and third neural networks (202*a*, 202*b*, and 202*c*), the training module 212 creates the dataset for training the first, second, and third neural networks (202*a*, 202*b*, and 202*c*). The dataset includes one of the local dataset and the global dataset. The training module 212 selects the at least two sets of frames from the created dataset and adds the synthetic motion to the selected at least two sets of frames. On adding the synthetic motion to the selected at least two sets of frames, the training module 212 performs the Siamese training of the first, second, and third neural networks (202*a*, 202*b*, and 202*c*) using the ground truth media and the at least two sets of frames added with the synthetic motion.

FIGS. 1 and 2 show exemplary blocks of the electronic device 100, but it is to be understood that other embodiments are not limited thereon. In other embodiments, the electronic device 100 may include less or more number of blocks. Further, the labels or names of the blocks are used only for illustrative purpose and does not limit the scope of the embodiments herein. One or more blocks can be combined together to perform same or substantially similar function in the electronic device 100.

Embodiments herein further describe the enhancement of the media by considering the media as a video for example, but it may be obvious to a person skilled in the art that any other type of media may be considered.

Figure 3:
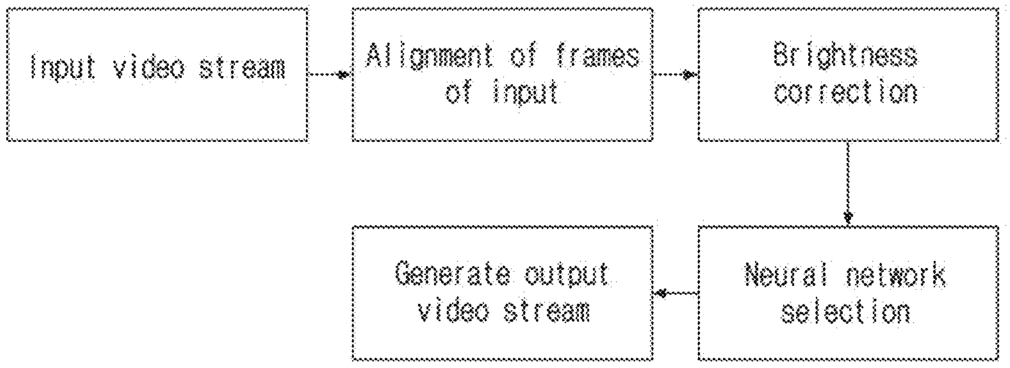
FIG. 3 is an example conceptual diagram depicting enhancing of video, according to embodiments of the disclosure.

FIG. 3 is an example conceptual diagram depicting enhancing of the video, according to embodiments of the disclosure. Embodiments herein enable the electronic device 100 to efficiently switch between the high and low complexity neural networks (202*a*, 202*b*, and 202*c*) for denoising and deflickering based on the shot boundary detection and the artificial light flickering. Thus, improving average running time for neural network based video enhancement.

The electronic device 100 identifies key frames of the video by computing the temporal similarity between the frames of the video. The key frames may be referred to the frames of the video, which have been associated with the shot boundary detection. The electronic device 100 uses the HCN 202*a* for denoising the key frames of the video. The electronic device 100 uses the TG-LCN for denoising non-key frames of the video using a temporal output guidance. The non-key frames of the video may be the frames of the video including the artificial light flickering. The temporal output guidance may refer to the previous output frame, which has been used as the guide. Both the HCN 202*a* and the TG-LCN 202*b* may be composed of multi-scale inputs with convolutional guided filters for fast processing and reduced memory. The electronic device 100 may use the third neural network 202*c* for denoising the frames of the video, which do not include the artificial light flickering or do not associate with the shot boundary detection (i.e., having the temporal similarity with the other frames).

Figure 4:
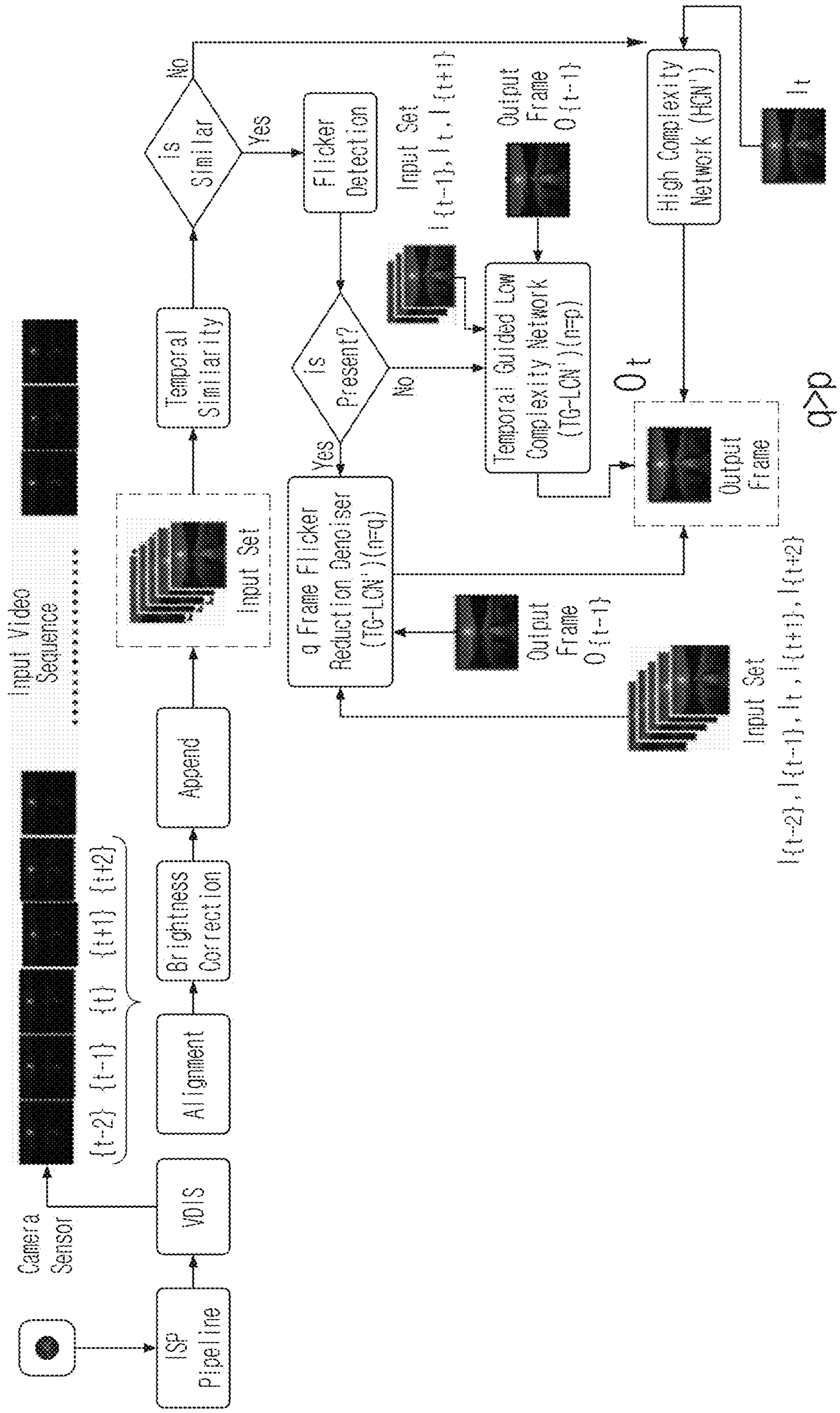
FIG. 4 illustrates an example image signal processing (ISP) inference pipeline for enhancing the video captured under low light conditions and/or using low-quality sensors, according to embodiment of the disclosure.

FIG. 4 illustrates an example image signal processing (ISP) inference pipeline for enhancing the video captured under the low light conditions and/or using the low-quality sensors, according to embodiment of the disclosure.

The electronic device 100 receives the video for enhancing, wherein the received video may be captured under the low light conditions or using the low quality sensors. On receiving the video, the electronic device 100 may perform a Vision Defect Identification System (VDIS) (an optional step) on the video to detect and correct any defects in the video.

After performing the VDIS, the electronic device 100 aligns the frames of the video (using any suitable existing methods). In an example herein, consider that the received video may include five consecutive frames ($I_{t-2}$, $I_{t-1}$, $I_t$, $I_{t+1}$, $I_{t+2}$) (i.e., q=5) (referred as input frames). After aligning the input frames of the video, the electronic device 100 performs the brightness correction on the input frames of the video.

After performing the brightness correction, the electronic device 100 checks if the shot boundary detection is associated with the input frames by checking the temporal similarity between the input frames of the video. If the input frames are not similar (i.e., the shot boundary detection is associated with the input frames), the electronic device 100 uses the HCN to generate the output frames for the input frames that are not similar. In an example herein, consider that the input frame ($I_t$) is associated with the shot boundary detection. In such a scenario, the electronic device 100 uses the HCN to generate the output frame ($O_t$) by denoising the input frame ($I_t$).

If the input frames are similar (i.e., absence of the shot boundary detection), the electronic device 100 checks the input frames ('q' frames) to detect whether the artificial light flickering is present due to artificial lights. If the artificial light flickering is present in the 'q' (i.e., 5) input frames, the electronic device 100 uses the TG-LCN/'q' frame flicker reduction denoiser 202*b* (n=q) to generate the output frame (OA using the 'q' input frames and the previous output frame '$O_{t-1}$'. The 'q' frame flicker reduction denoiser (TG-LCN) (n=q) performs the denoising and flicker elimination on the 'q' input frames. If artificial flickering due to the artificial lights is not present in the 'q' input frames, the electronic device 100 uses the third neural network/TG-LCN (n=p) 202*c* to generates the output frame ($O_t$), using 'p' input frames (for example, 'p'=3 in the example shown in FIG. 4, ($I_{t-i}$, $I_t$, $I_{t+1}$)) and the previous output frame '$O_{t-1}$ '. Using the $O_{t-1}$ as the guide allows the second neural network/TG-LCN 202*b* and the third neural network/TG-LCN (n=p) 202*c* of much lower complexity to be used. In the video sequence as shown in FIG. 4, most frames are temporally similar, and hence the lower complexity gets deployed majorly, thus reducing the average time and power.

Figure 5:
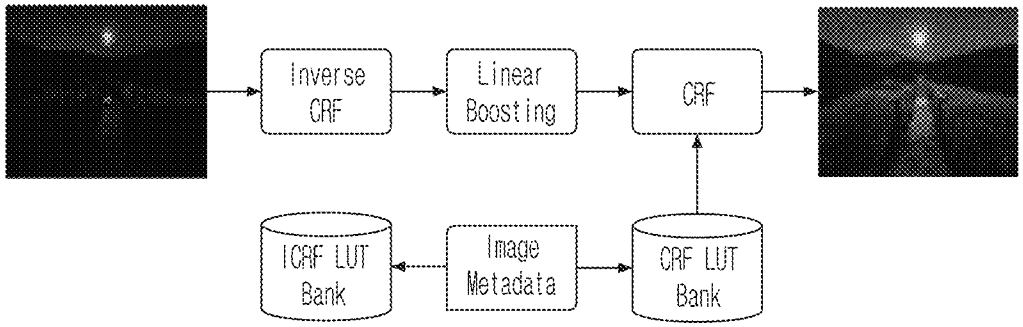
FIGS. 5 and 6 are example diagrams depicting brightness correction performed on the video, while enhancing the video, according to embodiments of the disclosure.
Figure 6:
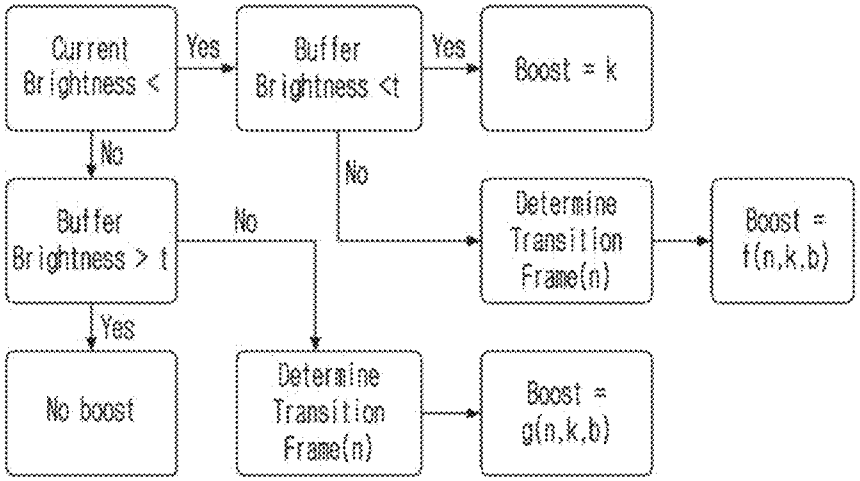

FIGS. 5 and 6 are example diagrams depicting the brightness correction performed on the video, while enhancing the video, according to embodiments of the disclosure. Embodiments herein enable the electronic device 100 to perform the brightness correction for correcting the brightness of the video using the LUT. The LUT may be selected by the electronic device 100 based on histogram statistics of the video. The LUT/set of LUTs may be predefined by tuning. The CFR and ICFR may be characterized in the LUT. The LUT may include a CFR LUT bank for storing the CFR and a ICFR LUT bank for storing the ICFR.

The electronic device 100 receives the single or the multiple frames of the video/video sequence as the input. The electronic device 100 linearizes the input frame using the ICFR. The electronic device 100 then chooses the brightness value using the temporal future temporal guidance. Choosing the brightness value is shown in FIG. 6.

As shown in FIG. 6, for choosing the brightness value, the electronic device 100 analyzes the brightness of the input frame (i.e., a current frame) and the future temporal buffer of 'b' frames. On analyzing that the brightness of the input frame is less than the threshold (t) and the brightness of all the frames in the future temporal buffer of size 'b' (i.e., the future temporal buffer of 'b' frames) is less than the threshold (t), the electronic device 100 chooses the maximum constant boost value as the brightness value. On analyzing that the brightness of the input frame is less than the threshold (t) and the brightness of all the frames in the future temporal buffer of size 'b' is greater than the threshold (t), the electronic device 100 chooses the boost value 'k' of monotonically decreasing function 'f' as the brightness value. On analyzing that the brightness of the input frame is greater than the threshold (t) and the brightness of the all the frames in the future temporal buffer of size 'b' is greater than the threshold (t), the electronic device 100 does not apply any boost/brightness value. On analyzing that the brightness of the input frame is greater than the threshold (t) and the brightness of any of the frames in the future temporal buffer of size 'b' is less than the threshold (t), the electronic device 100 chooses the boost value 'k' of monotonically increasing function 'g' as the brightness value. Thus, a temporally linearly varying boost is applied for a smooth transition of the brightness. In an example, the function 'f' and the function 'g' may be chosen empirically by tuning and may be calculated as:

$$f(n, k, b)\text{:boost} = \frac{1-k}{b}(b-n)+k$$

$$g(n, k, b)\text{:boost} = \frac{k-1}{b}(b-n)+k$$

where 'n' indicates a number of frames of the video.

After choosing the brightness value, the electronic device 100 applies the linear boost on the input frame based on the chosen brightness value. The electronic device 100 applies the CRF on the input frame to correct the brightness of the input frame. The CRF is the function of the sensor type and the metadata.

Figure 7:
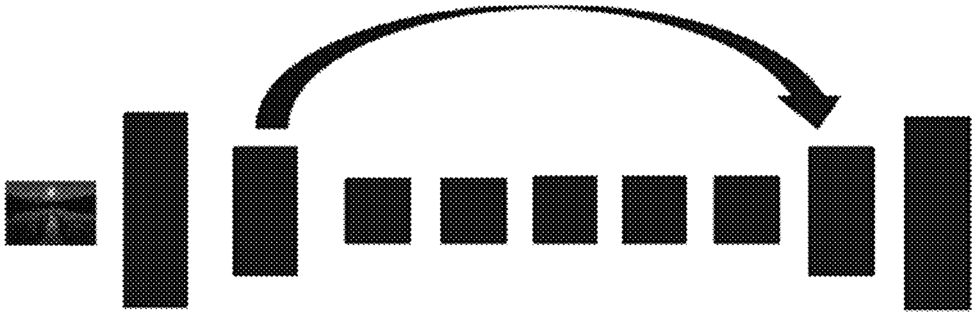
FIG. 7 illustrates a high complexity network (HCN) for processing frames of the video, if shot boundary detection is associated with the frames of the video, according to embodiments of the disclosure.

FIG. 7 illustrates the HCN 202*a* for processing the frames of the video, if the shot boundary detection is associated with the frames of the video, according to embodiments of the disclosure.

The HCN 202*a* may be a single frame denoising network. The HCN 202*a* comprises of multiple residual blocks at the lowest level to improve noise removal capabilities. The HCN 202*a* may process the input frames of the video that do not have the temporal similarity (i.e., associated with shot boundary detection) to generate the output video, which is the denoised video.

Figure 8:
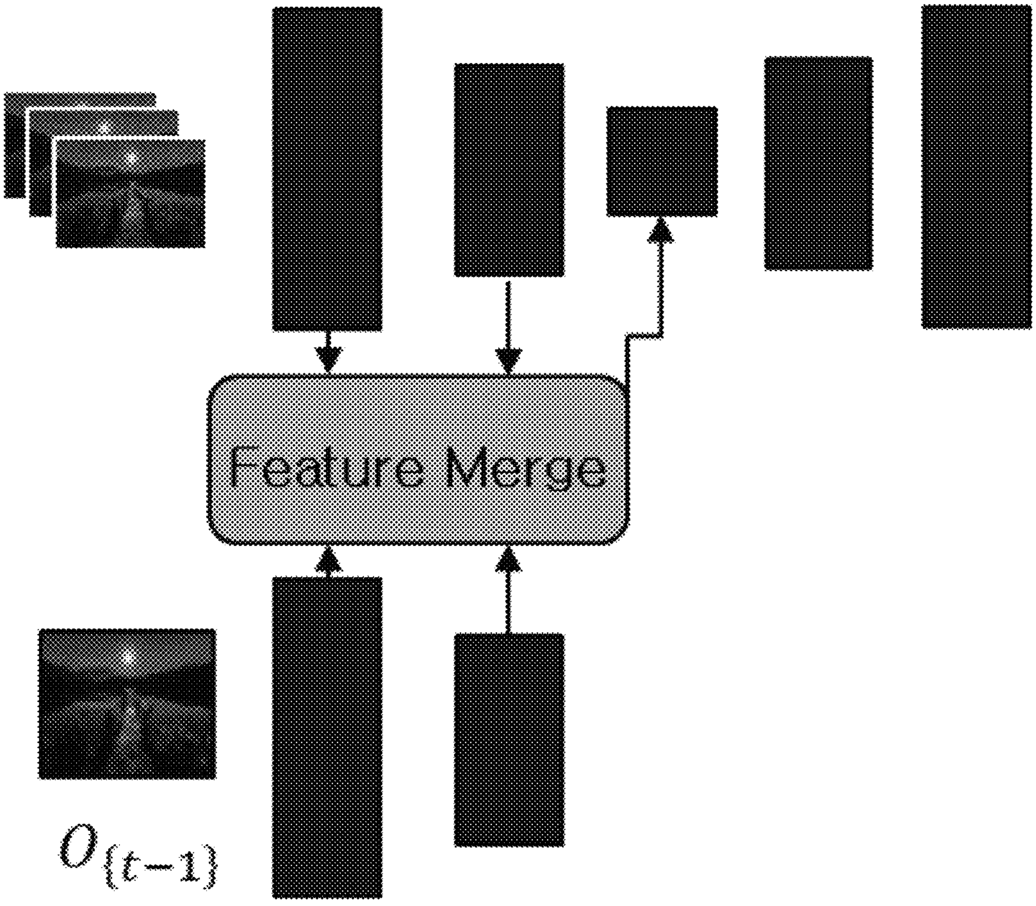
FIG. 8 illustrates a temporal guided low complexity network (TG-LCN) for processing the multiple frames of the video, if the artificial light flickering is present in the multiple frames, according to embodiments of the disclosure.

FIG. 8 illustrates the TG-LCN 202*b* for processing the multiple frames of the video, if the artificial light flickering is present in the multiple frames, according to embodiments of the disclosure.

The TG-LCN/TG-LCN (n) may be a multi-frame denoising network, wherein 'n' depicts the input frames of the video. The TG-LCN 202*b* uses the previous output frame as the guide to process the input frames of the video to generate the output video, which allows the TG-LCN of much lower complexity than the HCN 202*a*. The TG-LCN does not use the residual blocks. The convolutional operations involved in the TG-LCN may contain less feature maps to reduce computation.

Figure 9:
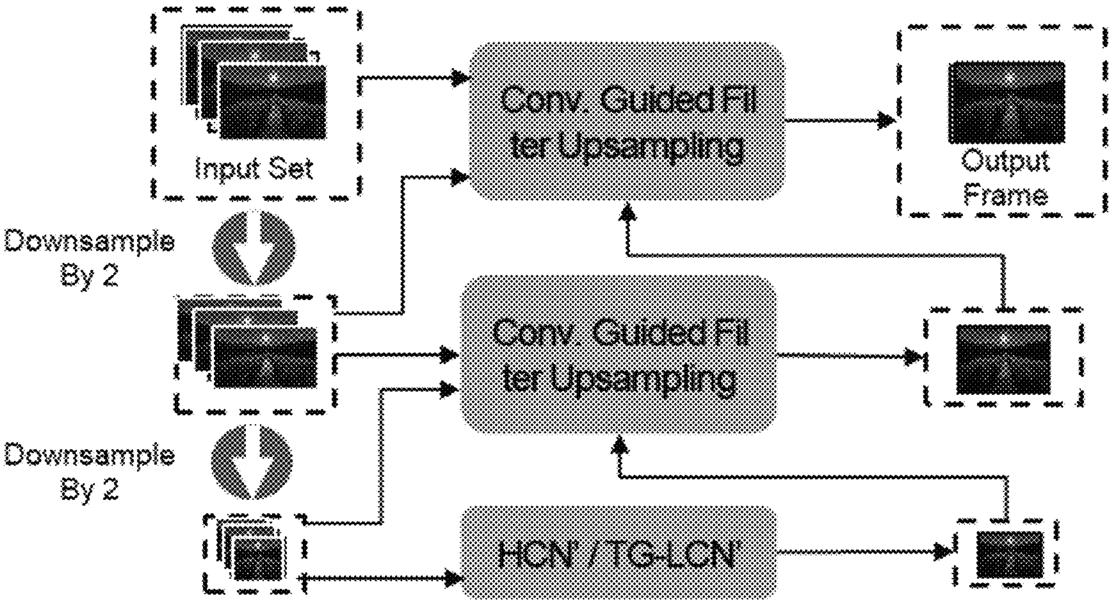
FIG. 9 is an example diagram depicting a multi-scale pyramid approach to generate an output video by processing the frames of the video, according to embodiments disclosed herein.

FIG. 9 is an example diagram depicting a multi-scale pyramid approach to generate the output video by processing the frames of the video, according to embodiments of the disclosure. Embodiments may adopt the multi-scale pyramid approach to process the frames of the vide to manage the execution time for both the HCN 202*a* and the TG-LCN (n) 202*b*, wherein the 'n' is the number of input frames.

The electronic device 100 receives the single frame or plurality of frames of the video as the input processing frame/input frames. The electronic device 100 down samples the input processing frame over multiple scales at the lower resolutions to generate the low-resolution input. The input processing frame may be down sampled at $$\left(\frac{1}{16}\right)^{th}$$

resolution. The electronic device 100 uses the selected HCN 202*a* or the TG-LCN (n=q) 202*b*, or the third neural network 202*c* for processing the low-resolution input to generate the low-resolution output. The electronic device 100 upscales/up samples the low-resolution output at every lower level over the multiple scales using Convolution Guided Filters (CGF) to generate the output video. The CGF accepts the higher resolution input set, the low-resolution input and the low-resolution output to generate the output video having the higher resolution output image.

In an embodiment herein, the network, where the multi-scale pyramidal approach is applied to the HCN 202*a* may be denoted by HCN', and the network where the multi-scale pyramidal approach is applied to TG-LCN 202*b* is denoted by TG-LCN'. The electronic device 100 dynamically varies the complexity of the HCN 202*a*, the TG-LCN 202*b*, or the third neural network 202*c* with the inverse relationship with respect to the number of frames of the video.

Figure 10:
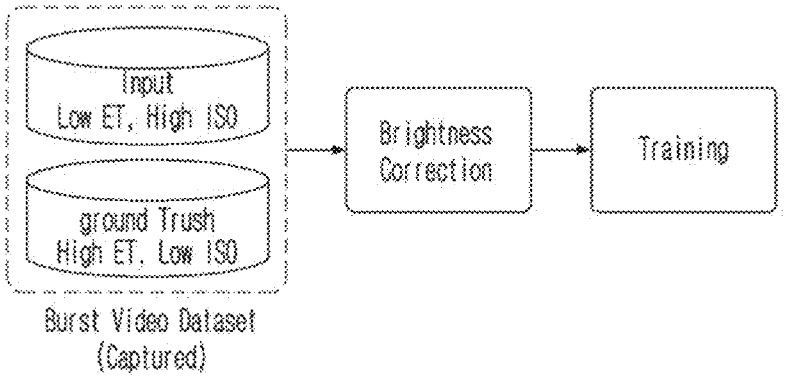
FIG. 10 is an example diagram depicting training of a first/second/third neural network for enhancing the video/media stream, according to embodiments of the disclosure.

FIG. 10 is an example diagram depicting training of the first, second, and third neural networks (202*a*, 202*b*, and 202*c*) for enhancing the video/media stream, according to embodiments of the disclosure.

For training the first, second, and third neural networks (202*a*, 202*b*, and 202*c*), the electronic device 100 creates the dataset using low and higher exposure burst shots and uses self-supervised approaches for refining the dataset. The electronic device 100 corrects the brightness of the created dataset. The electronic device 100 then trains the first, second, and third neural networks (202*a*, 202*b*, and 202*c*) using the multi-frame Siamese training method and self-similarity loss for temporal consistency.

Figure 11:
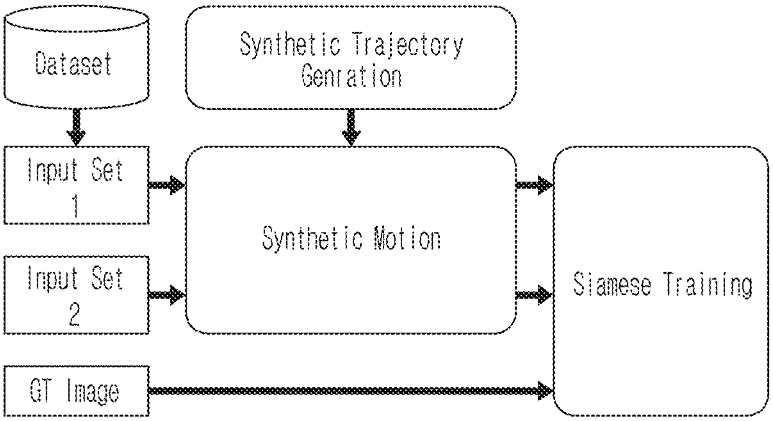
FIG. 11 is an example diagram, depicting training of the first/second/third neural network using a multi-frame Siamese training method, according to embodiments of the disclosure.

FIG. 11 is an example diagram, depicting training of the first, second, and third neural networks (202*a*, 202*b*, and 202*c*) using the multi-frame Siamese training method, according to embodiments of the disclosure. The video may include the similar frames having different noise realizations, which may lead to temporal inconsistencies in the final output video. Thus, the Siamese training may be used to train the first, second, and third neural networks (202*a*, 202*b*, and 202*c*). The electronic device 100 trains the first, second, and third neural networks (202*a*, 202*b*, and 202*c*) over multiple iterations/scales.

Figure 12:
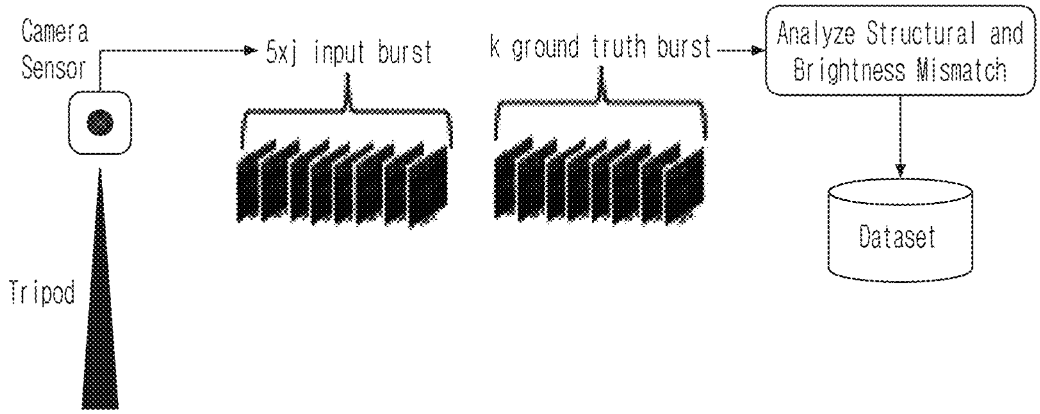
FIG. 12 is an example diagram depicting creation of a dataset for training the first/second/third neural network, according to embodiments of the disclosure.

The electronic device 100 first creates the dataset for training the first, second, and third neural networks (202*a*, 202*b*, and 202*c*). Creating the dataset is shown in FIG. 12. As shown in FIG. 12, the electronic device 100 captures the burst dataset of the low light scenes using the camera 106. In an example herein, every capture may consist of 15 noisy inputs and 1 clean ground truth frame. In an example herein, the burst dataset may be captured at auto exposure, ET and $$\left(\frac{1}{k}\times\right)$$

Figure 13A:
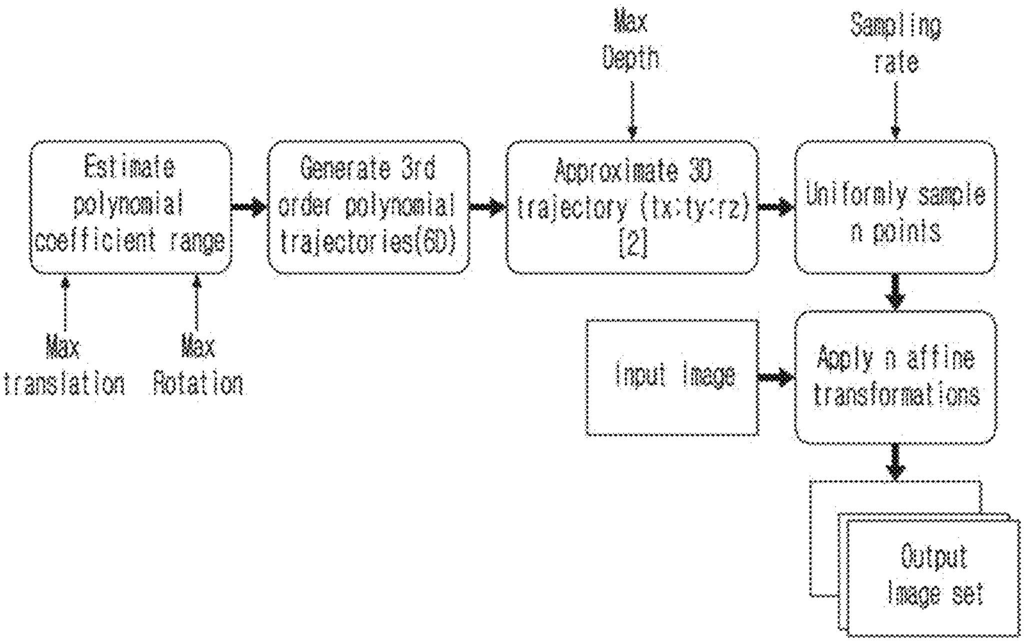
FIGS. 13A and 13B are example diagrams depicting simulation of a global motion, and a local motion on a burst dataset, according to embodiments of the disclosure.
Figure 13B:
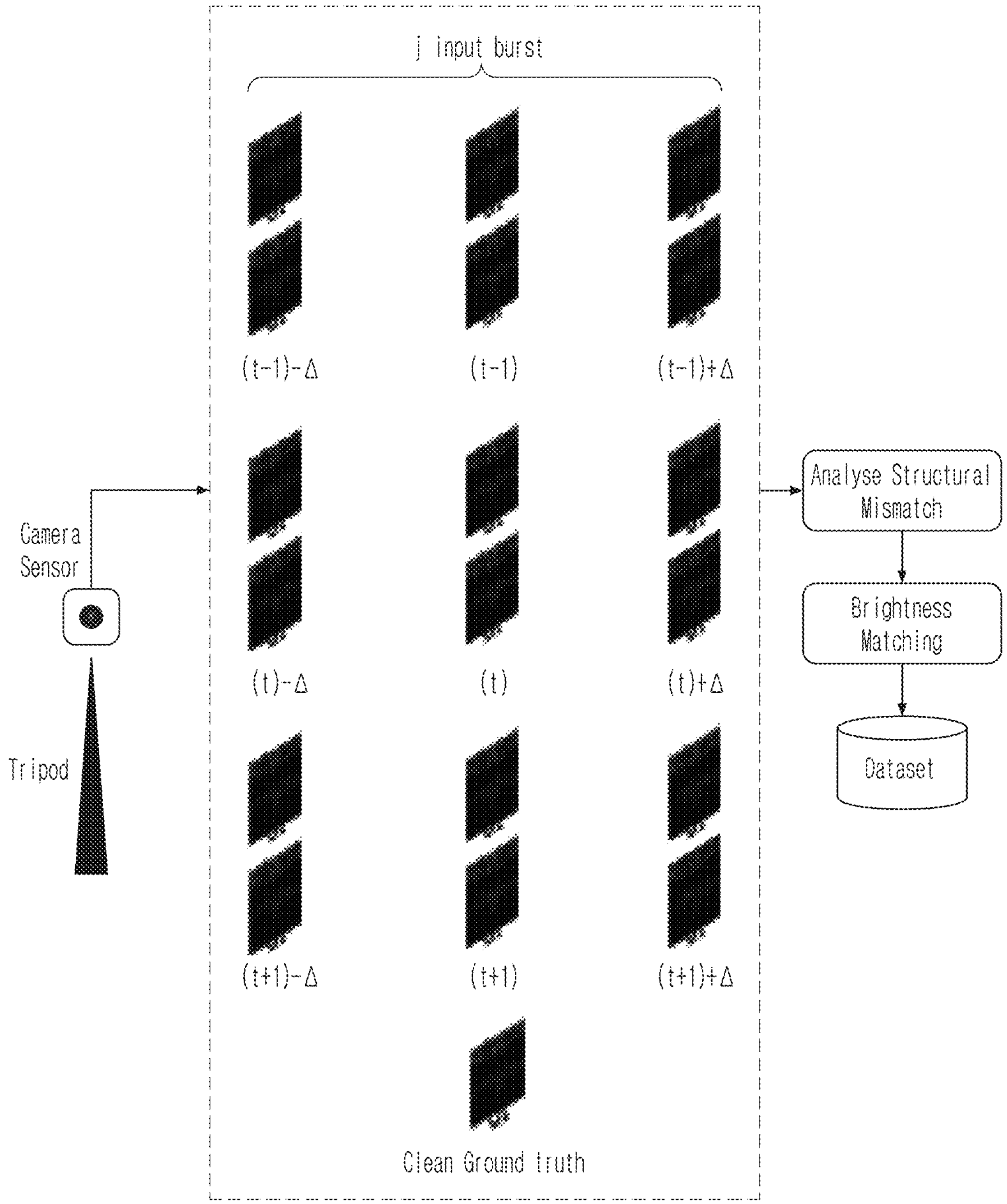

ISO of input k>>1. In an example herein, every capture of the burst dataset may consist of a set of 5×j noisy inputs and k≤j clean ground truth frames. In an example herein, the electronic device 100 may use any application like a custom dump application for capturing the burst dataset. After capturing the dataset, the electronic device 100 simulates the global motion and the local motion of each burst dataset using the synthetic trajectory generation and the synthetic stop motion, respectively. Thereby, creating the local dataset, and the global dataset. Simulating the global motion and the local motion is shown in FIGS. 13A and 13B. In an example, the global motion and the local motion may be simulated on the burst dataset captured at 5 relative auto exposures for data augmentation relative multiplication factor, MF∈[3, 2, 1 (EV0), 0.5, 0.33]. In an example, the burst dataset may be captured at the auto exposure ET of EV0 limited to <33 milliseconds (i.e., 30 frames per second (FPS)). In an example herein, the clean ground truth frame may be captured at $$ISO = 50 \text{ and } ET = \left(\frac{ISO_{EV0}}{50}\right)\times ET_{EV0}.$$

As shown in FIG. 13A, for simulating the global motion, the electronic device 100 estimates the polynomial coefficient range based on the parameters including the maximum translation and the maximum rotation. The maximum translation and the maximum rotation controls maximum displacement. The electronic device estimates the polynomial coefficient range based on the parameters including the maximum translation and the maximum rotation. The electronic device 100 then generates the 3rd order polynomial trajectory using the estimated polynomial coefficient range and approximates the 3rd order trajectory using the maximum depth. The 3rd order trajectory may be the trajectory followed by the camera 106 used to capture the burst dataset. The electronic device 100 generates the 'n' affine transformations based on the generated uniform sample points. In an example herein, the uniform sample points may be generated using the sampling rate that controls the smoothness between the frames of each burst dataset. The electronic device 100 applies the generated 'n' affine transformations on each burst dataset. Thereby, creating the global dataset by simulating the global motion on each burst dataset.

As shown in FIG. 13B, for simulating the local motion, the electronic device 100 uses two local motion characteristics, the local object motion/object motion, and the motion blur. The electronic device 100 captures the local object motion by moving properties (props) locally in a static scene (i.e., the synthetic stop motion). In an embodiment, capturing the local object motion includes capturing the input and the ground truth scene with only the background, and capturing the input and the ground truth scene with only the foreground object. The electronic device 100 crops out the foreground object and creates the synthetic scenes by positioning the foreground object at the different locations of the background scene. The electronic device 100 selects 3 sets of input frames (t−1, t, t+1) from the captured input, which have been required for each training pair. The electronic device 100 simulates the motion blur for each stop motion by averaging the selected 3 sets of input frames to 5 (x−Δ, x, x+Δ) frames for the properties (props). The electronic device 100 may use the two captures per static scene for the Siamese training of the first, second, and third neural networks (202*a*, 202*b*, and 202*c*). In an example herein, a minimum number of input frames per training pair, j=3×3×2=18 frames. The ground truth may be captured and aligned with T frame. In an example herein, the burst dataset including 1000 training pairs (>500 captured) may be captured to create the dataset for training the first, second, and third neural networks (202*a*, 202*b*, and 202*c*).

As shown in FIG. 12, on simulating the global motion and the local motion, the electronic device 100 removes the at least one burst dataset with structural and brightness mismatches between the clean ground truth frame and the low light static media. The electronic device 100 creates the dataset by including the at least one burst dataset that does not include the structural and brightness mismatches between the clean ground truth frame and the low light static media. The electronic device 100 further boosts the brightness of the created dataset and the clean ground truth frame and saves the created dataset and the clean ground truth frame in the memory 102.

Once the dataset has been created, as shown in FIG. 11, the electronic device 100 adds the synthetic motion to the at least two sets of frames of the created dataset using synthetic trajectories to account for motion during inference in accordance with a synthetic modelling. The synthetic modelling comprises of performing a trajectory modelling for 3 degrees of rotational and translational freedom using the 3rd order polynomials. The 3 degrees of rotational and translational freedom may be uniformly sampled from an interval [0, t] to generate the uniform sampling points, where t represents simulated capture duration. The synthetic frames may be generated by applying homography on the selected each set of frames corresponding to the chosen uniform sampling points. After adding the synthetic motion to each of the selected at least two sets of frames, the electronic device 100 performs the Siamese training of the first, second, and third neural networks (202*a*, 202*b*, and 202*c*). The Siamese training of the first, second, and third neural networks (202*a*, 202*b*, and 202*c*) is shown in FIG. 14.

Figure 14:
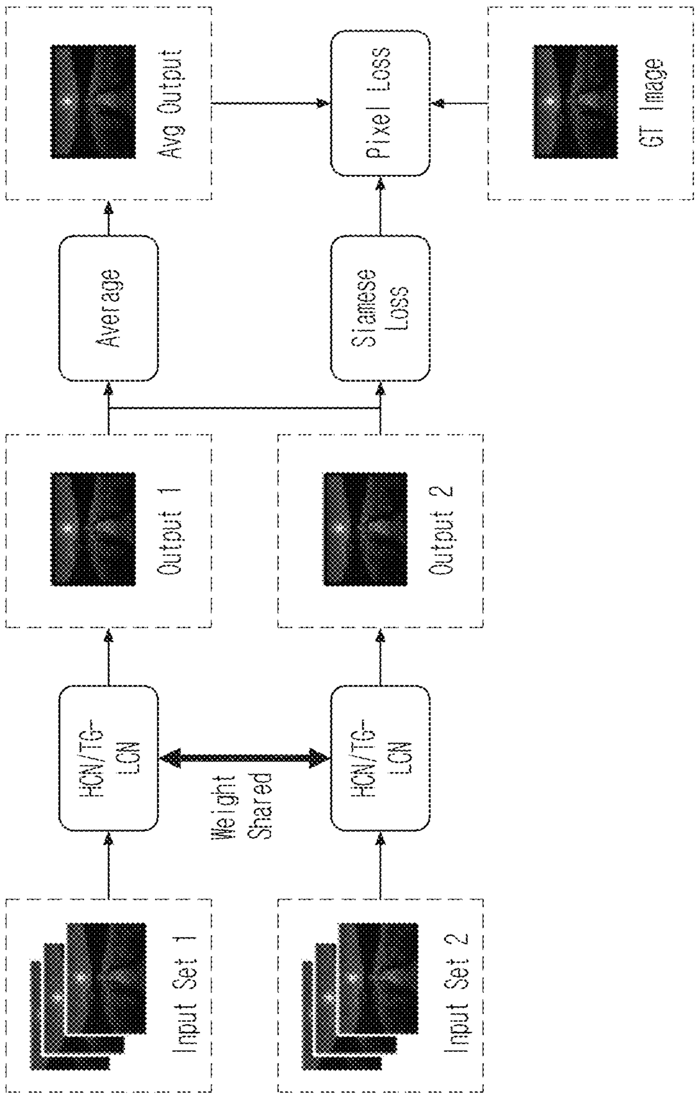
FIG. 14 is an example diagram depicting Siamese training of the first/second/third neural network, according to embodiments of the disclosure.

As shown in FIG. 14, the two of the first, second, and third networks (202*a*, 202*b*, and 202*c*) may be used while training. The electronic device 100 passes a first input set (input set 1) from the created dataset to a first set of neural network (which may include the first neural network (202*a*) and/or the second neural network (202*b*) and/or the third neural network (202*c*)). The electronic device 100 passes a second input set (input set 2) from the created dataset to a second set of neural network (which may include the first neural network (202*a*) and/or the second neural network (202*b*) and/or the third neural network (202*c*)). The first set of neural network and the second set of neural network share an identical weightage/weight. The first set of neural network generates a first output (output 1) by processing the first input set. The second set of neural network generates a second output (output 2) by processing the second input set. The first/second output may be the video/media including the denoised frames with zero artificial light flickering.

The electronic device 100 computes the Siamese loss by computing the L2 loss between the output 1 and the output 2. The electronic device 100 also computes the pixel loss by computing the average of the output 1 and the output 2 and the ground truth. The electronic device 100 computes the total loss using the Siamese loss and the pixel loss. The electronic device 100 trains the first, second, and third neural networks (202*a*, 202*b*, and 202*c*) using the computed total loss.

Figure 15A:
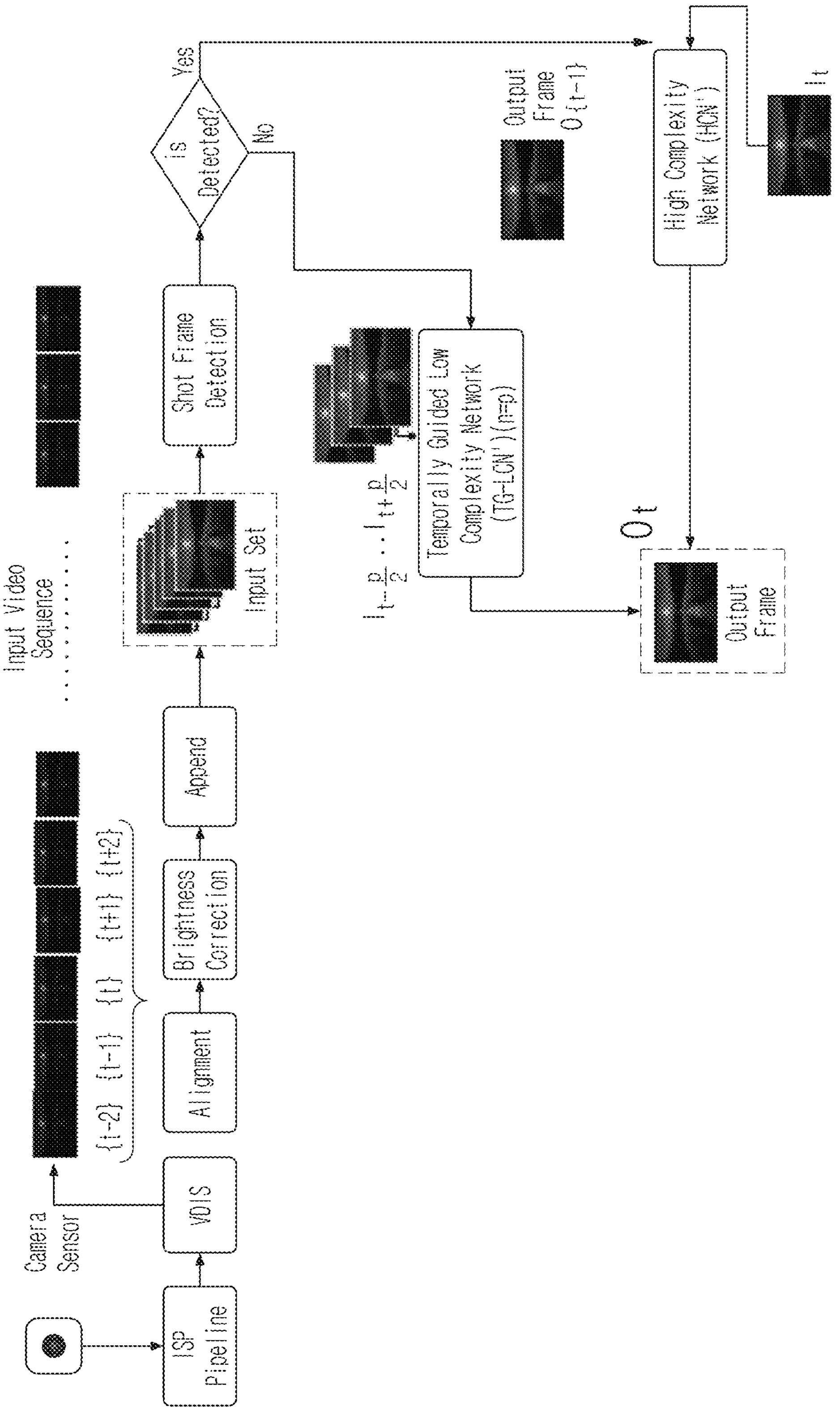
FIGS. 15A and 15B are example diagrams depicting a use case scenario of enhancing a low frame per second (FPS) video captured under low light conditions, according to embodiments of the disclosure.
Figure 15B:
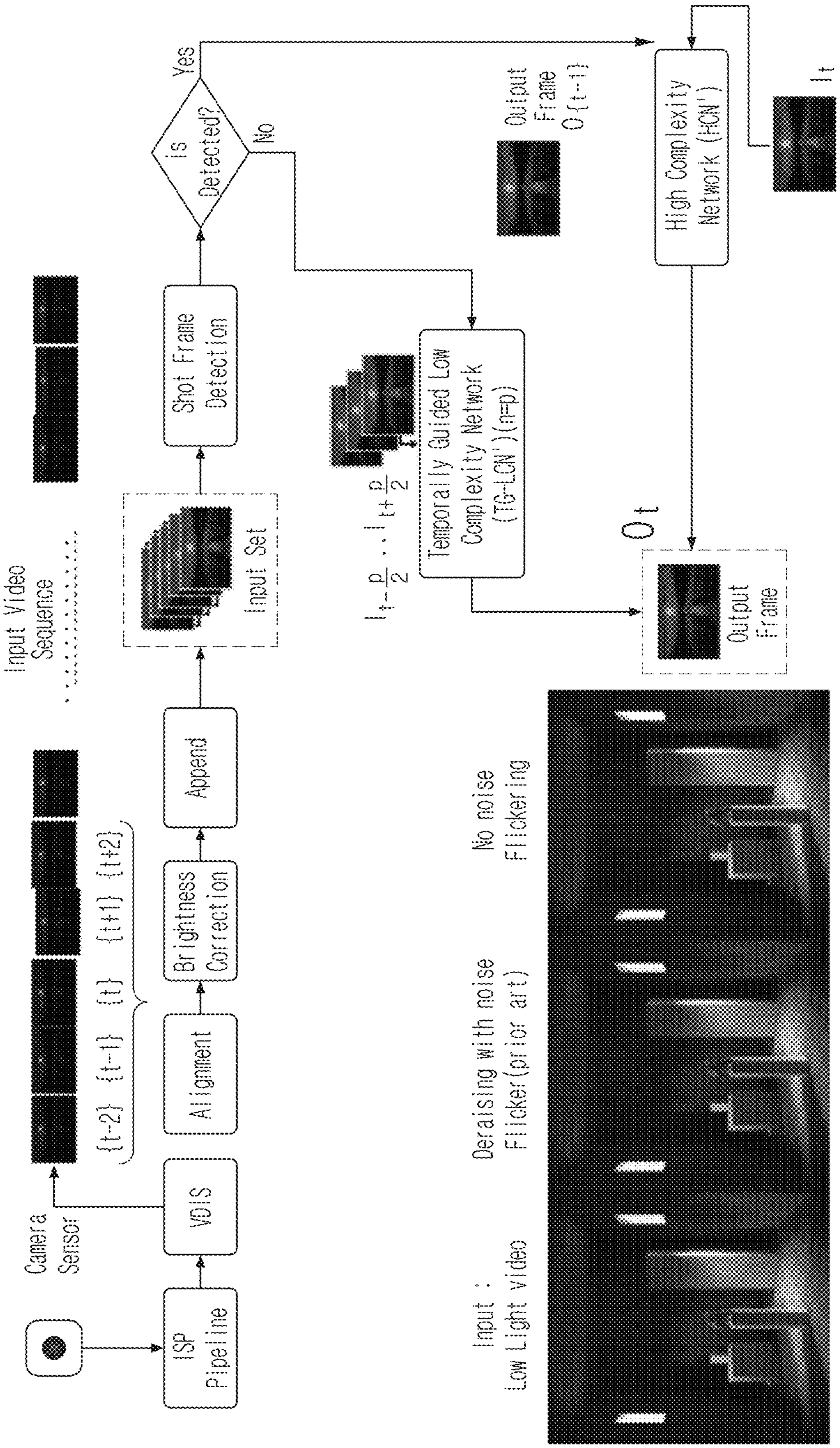

FIGS. 15A and 15B are example diagrams depicting a use case scenario of enhancing a low FPS video captured under the low light conditions, according to embodiments of the disclosure.

Consider an example scenario, wherein the electronic device 100 receives the low FPS video captured under the low light conditions for enhancement, wherein the low FPS video refers to the video with the FPS of up to 60. In such a scenario, the electronic device performs the VDIS and aligns the input frames of the video. The electronic device 100 performs the brightness correction on the input frames of the video and appends the aligned input frames of the video to form the input video sequence.

The electronic device 100 checks if the shot boundary detection is associated with the input frames of the input video sequence by analyzing the temporal similarity between the input frames. In an example herein, consider that the input frame ($I_t$) does not have the temporal similarity with the other input frames $$\left(I_{t-\frac{p}{2}} \cdots I_{t+\frac{p}{2}}\right).$$

In such a scenario, the electronic device 100 selects the HCN 202*a* for processing the input frame ($I_t$) and the third neural network/TG-LCN (n=p) 202*c* for processing the input frames $$\left(I_{t-\frac{p}{2}} \cdots I_{t+\frac{p}{2}}\right)$$

to generate the output video $O_t$.

In an embodiment, since the artificial light flickering is minimal in the low FPS video, the electronic device 100 does not check the presence of the artificial light flickering in the input frames of the input video sequence.

Figure 16:
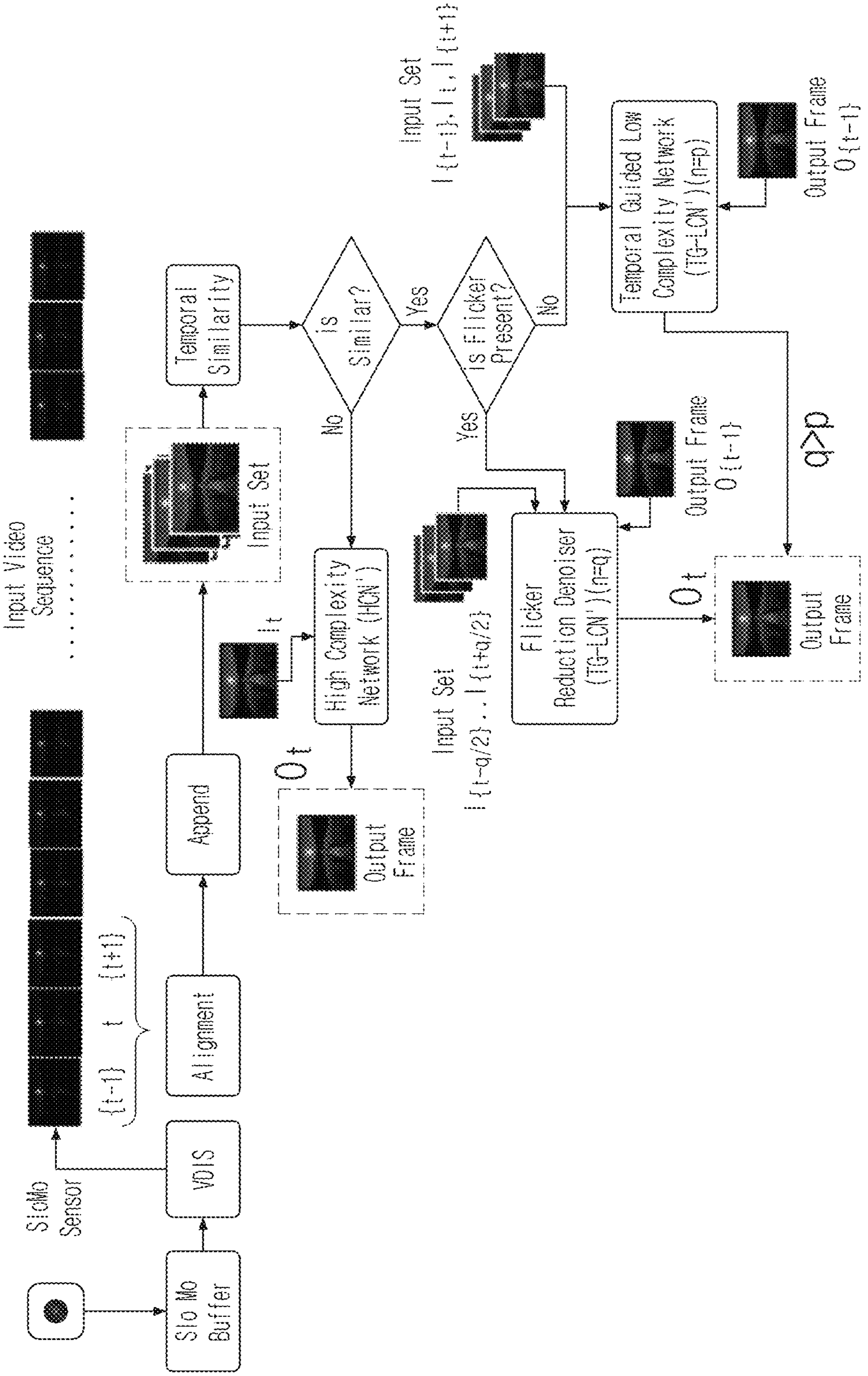
FIG. 16 is an example diagram depicting a use case scenario of enhancing an indoor slow motion video, according to embodiments of the disclosure.

FIG. 16 is an example diagram depicting a use case scenario of enhancing an indoor slow motion video, according to embodiments of the disclosure.

Consider an example scenario, wherein the electronic device 100 receives the indoor slow motion video captured at high frame rates (240/960 FPS), thereby resulting in the video frames with noise. In such a scenario, the electronic device 100 enhances the indoor slow motion video by denoising and removing the artificial light flickering from the slow motion video. The electronic device checks the input frames of the slow motion video for the temporal similarity. If the input frames are not similar (i.e., presence of the shot boundary detection), the electronic device 100 uses the HCN 202*a* to generate the output frame (OA wherein the current frame ($I_t$) serves as input to the HCN' 202*a* and the HCN' 202*a* denoises the current frame ($I_t$). If the input frames of the slow motion video are similar (i.e., absence of the shot boundary detection), the electronic device 100 checks if the artificial light flickering is present in the input frames ('q' input frames) of the slow motion video due to the artificial lights. If the artificial light flickering is present in the 'q' input video frames, the electronic device 100 selects the second neural network/'q' frame flicker reduction denoiser (TG-LCN') (n=q) 202*b* to generate the output video frame (OA using the 'q' input frames and the previous output frame $O_{t-1}$. The q frame flicker reduction denoiser (TG-LCN') (n=q) 202*b* performs the denoising and flicker elimination on the q input video frames. If artificial light flickering is not present in the 'q' input video frames, the electronic device 100 uses the third neural network/TG-LCN'(n=p) 202*c* to generate the output video frame ($O_t$), using p input frames ((p=3 in the shown example) ($I_{t-1}$, $I_t$, $I_{t+1}$)) and the previous output frame $O_{t-1}$. Using the $O_{t-1}$ as the guide allows to use a network of much lower complexity and also helps in removing the artificial light flickering.

Figure 17:
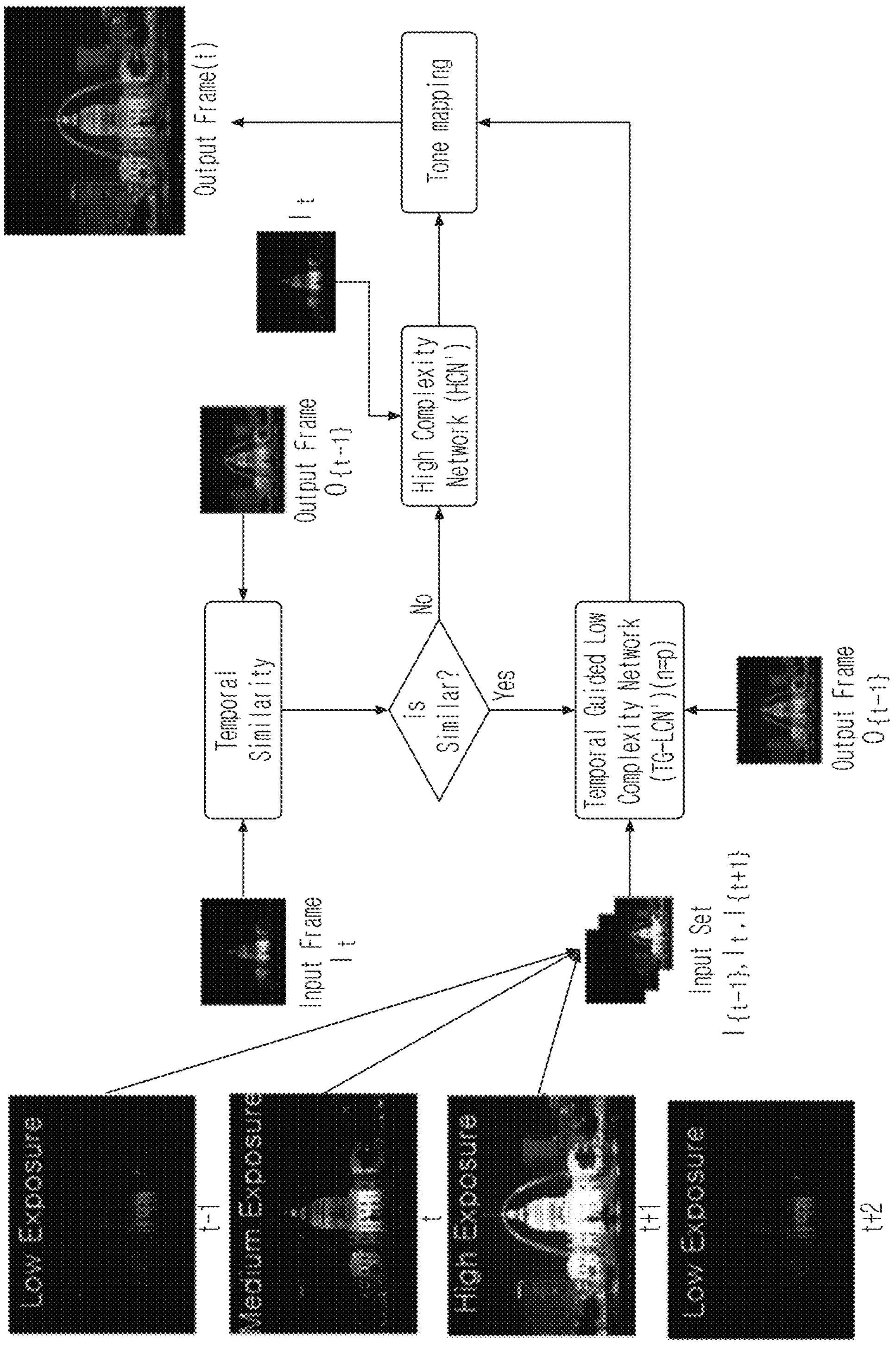
FIG. 17 is an example diagram depicting a use case scenario of enhancing a real-time High Dynamic Range (HDR) video, according to embodiments of the disclosure.

FIG. 17 is an example diagram depicting a use case scenario of enhancing a real-time High Dynamic Range (HDR) video, according to embodiments of the disclosure. The HDR video may be generated using alternating exposures. Each consecutive 3 frames form the input dataset from the HDR video. In an example scenario, as shown in FIG. 17, an output frame 1 (t) may be obtained using low (t−1), medium (t) and high frames (*t+1). The output frame 2 (t+1) may be obtained using medium (t), high (t+1) and low (t+2) frames and so on. The temporal similarity may be measured between the previous output frame and the current input frame.

Figure 18:
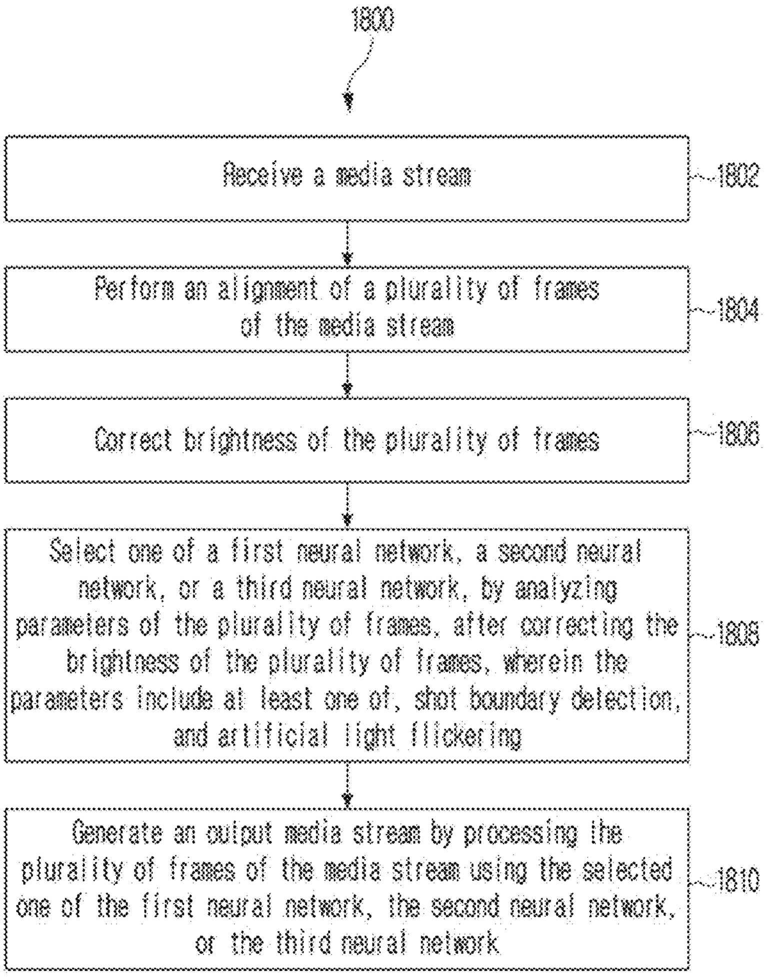
FIG. 18 is a flow chart depicting a method for enhancing the media stream, according to embodiments of the disclosure.

FIG. 18 is a flow chart 1800 depicting a method for enhancing the media stream, according to embodiments of the disclosure.

At step 1802, the method includes receiving, by an electronic device 100, the media stream. At step 1804, the method includes performing, by the electronic device 100, the alignment of the plurality of frames of the media stream. At step 1806, the method includes correcting, by the electronic device 100, the brightness of the plurality of frames.

At step 1808, the method includes selecting, by the electronic device 100, one of the first neural network 202*a*, the second neural network 202*b*, or the third neural network 20*c*, by analyzing parameters of the plurality of frames, after correcting the brightness of the plurality of frames. The parameters include at least one of the shot boundary detection and the artificial light flickering.

At step 1810, the method includes generating, by the electronic device 100, the output media stream by processing the plurality of frames of the media stream using the selected one of the first neural network 202*a*, the second neural network 202*b*, or the third neural network 202*c*. The various actions in method 1800 may be performed in the order presented, in a different order or simultaneously. Further, in some embodiments, some actions listed in FIG. 18 may be omitted.

Embodiments herein provide methods and systems for enhancing videos in real time using temporal guided adaptive CNN switching, wherein the videos have been captured in extreme low light, under high noise conditions and/or captured using inferior sensors. Embodiments herein provide a deep learning based pipeline to achieve real time video enhancement while minimizing noise and flicker artifacts. Embodiments herein provide methods and systems to choose between high and low complexity networks by analyzing temporal consistency of input frames, thus reducing average time and power required to process a video. Embodiments herein provide use of Siamese training to reduce flicker.

Embodiments herein provide a method for low light video enhancement. The method comprises receiving an input video stream corrupted by noise, low brightness or color artifacts. The brightness is boosted to desired levels using a pre-tuned look up table. The temporal similarity of consecutive frames is analyzed. If there are dissimilar frames (based on the analysis of the consecutive frames), a high complexity single frame DNN model is deployed. If there are similar frames (based on the analysis of the consecutive frames), a lower complexity multi frame (p) DNN model (for example, a 3 frame DNN model) guided by previous output is deployed. On detecting artificial light flickering in the input video stream, an input comprising of multiple frames (q, where q>p) (for example, the input comprises of five frames) is used to perform flicker removal along with noise reduction. The output from one of the pathways is saved to the output video stream.

Embodiments herein provide a method for fast video denoising. The method includes receiving single or multiple frames as input. The frames are down sampled to lower resolutions using multiple scales. The video frames are processed at a lower resolution, generating a low resolution output. The low resolution output is upscaled over multiple levels using higher resolution frames as a guide. A low resolution network for down sampling and up sampling may be trained using Siamese training approach for temporal consistency.

Embodiments herein provide a deep learning based pipeline to achieve real-time video enhancement, while minimizing noise and flicker artifacts.

Embodiments herein provide a method to choose between high and low complexity networks by analyzing temporal consistency of input frames, thus reducing an average time required to process a video/media.

Embodiments herein provide a method to dynamically change network complexity at inference.

Embodiments herein provide a method for employing Siamese training to reduce the flicker.

The embodiments herein can be implemented through at least one software program running on at least one hardware device and performing network management functions to control the elements. The elements shown in FIGS. 1 and 2 can be at least one of a hardware device, or a combination of hardware device and software module.

The embodiments of the disclosure provide methods and systems for low light media enhancement. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments have been described, those skilled in the art will recognize that the embodiments herein can be practiced with modification within the spirit and scope of the embodiments as described herein.

What is claimed is:

1. A method for enhancing media, the method comprising:
receiving, by an electronic device, a media stream;
performing, by the electronic device, an alignment of a plurality of frames of the media stream;
correcting, by the electronic device, a brightness of the plurality of frames;
selecting, by the electronic device, one of a first neural network, a second neural network, or a third neural network, by analyzing parameters of the plurality of frames having the corrected brightness, wherein the parameters indicate whether artificial light flickering is present in the plurality of frames; and
generating, by the electronic device, an output media stream by processing the plurality of frames of the media stream using the selected one of the first neural network, the second neural network, or the third neural network,
wherein at least one of the first neural network, the second neural network, and the third neural network is trained based on a dataset, and
wherein the dataset is obtained by:
capturing burst datasets, wherein each burst dataset comprises at least one of low light static media with noise inputs and a clean ground truth frame;
simulating a global motion of each burst dataset using synthetic trajectory generation, and simulating a local motion of each burst dataset using a synthetic stop motion;
removing at least one burst dataset with structural and brightness mismatches between the clean ground truth frame and the low light static media; and
creating the dataset by including the at least one burst dataset that does not include the structural and brightness mismatches between the clean ground truth frame and the low light static media.

2. The method of claim 1, wherein the media stream is captured under low light conditions, and
wherein the media stream comprises at least one of noise, low brightness, artificial flickering, and color artifacts.

3. The method of claim 1, wherein the output media stream is a denoised media stream with enhanced brightness and zero flicker.

4. The method of claim 1, wherein the correcting the brightness of the plurality of frames of the media stream comprises:
identifying a single frame or the plurality of frames of the media stream as an input frame;
linearizing the input frame using an Inverse Camera Response Function (ICRF);
selecting a brightness multiplication factor for correcting the brightness of the input frame using a future temporal guidance;
applying a linear boost on the input frame based on the brightness multiplication factor; and
applying a Camera Response Function (CRF) on the input frame to correct the brightness of the input frame,
wherein the CRF is a function of a sensor type and metadata,
wherein the metadata comprises an exposure value and an International Standard Organization (ISO) value, and
wherein the CRF and the ICRF are stored as Look-up-tables (LUTs).

5. The method of claim 4, wherein the selecting the brightness multiplication factor includes:
analyzing the brightness of the input frame;
identifying a maximum constant boost value as the brightness multiplication factor, based on the brightness of the input frame being less than a threshold and a brightness of all frames in a future temporal buffer being less than the threshold;
identifying a boost value of monotonically decreasing function between the maximum constant boost value and 1 as the brightness multiplication factor, based on the brightness of the input frame being less than the threshold, and the brightness of all the frames in the future temporal buffer being greater than the threshold;
identifying a unit gain boost value as the brightness multiplication factor, based on the brightness of the input frame being greater than the threshold and the brightness of all the frames in the future temporal buffer being greater than the threshold; and
identifying a boost value of monotonically increasing function between 1 and the maximum constant boost value as the brightness multiplication factor, based on the brightness of the input frame being greater than the threshold, and the brightness of the frames in the future temporal buffer being less than the threshold.

6. The method of claim 1, wherein the parameters further indicate whether shot boundary detection is associated with each of the plurality of frames, and
wherein the selecting, by the electronic device, one of the first neural network, the second neural network or the third neural network comprises:
analyzing each frame with respect to earlier frames to determine whether the shot boundary detection is associated with each of the plurality of frames;
selecting the first neural network for generating the output media stream by processing the plurality of frames of the media stream, based on the shot boundary detection being associated with the plurality of frames;
analyzing a presence of the artificial light flickering in the plurality of frames, based on the shot boundary detection not being associated with the plurality of frames;
selecting the second neural network for generating the output media stream by processing the plurality of frames of the media stream, based on the artificial light flickering being present in the plurality of frames; and
selecting the third neural network for generating the output media stream by processing the plurality of frames of the media stream, based on the artificial light flickering not being present in the plurality of frames.

7. The method of claim 6, wherein the first neural network is a high complexity neural network with one input frame,
wherein the second neural network is a temporally guided lower complexity neural network with ‘q’ number of input frames and a previous output frame for joint deflickering or joint denoising, and wherein the third neural network is a neural network with 'p' number of input frames and the previous output frame for denoising, wherein 'p' is less than 'q'.

8. The method of claim 7, wherein the first neural network comprises multiple residual blocks at a lowest level for enhancing noise removal capabilities, and wherein the second neural network comprises at least one convolution operation with less feature maps and the previous output frame as a guide for processing a plurality of input frames.

9. The method of claim 6, wherein the first neural network, the second neural network and the third neural network are trained using a multi-frame Siamese training method to generate the output media stream by processing the plurality of frames of the media stream.

10. The method of claim 9, further comprising training a neural network of the at least one of the first neural network, the second neural network and the third neural network by:

creating the dataset for training the neural network, wherein the dataset comprises one of a local dataset and a global dataset;

selecting at least two sets of frames from the created dataset, wherein each set comprises at least three frames;

adding a synthetic motion to the selected at least two sets of frames, wherein the at least two sets of frames added with the synthetic motion comprise different noise realizations; and performing a Siamese training of the neural network using a ground truth media and the at least two sets of frames added with the synthetic motion.

11. The method of claim 1, wherein the simulating the global motion of each burst dataset comprises:

estimating a polynomial coefficient range based on parameters comprising a maximum translation and a maximum rotation;

generating 3rd order polynomial trajectories using the estimated polynomial coefficient range;

approximating a 3rd order trajectory using a maximum depth and the generated 3rd order polynomial trajectories;

generating uniform sample points based on a pre-defined sampling rate and the approximated 3rd order trajectory;

generating 'n' affine transformations based on the generated uniform sample points; and applying the generated n affine transformations on each burst dataset.

12. The method of claim 1, wherein the simulating the local motion of each burst dataset comprises:

capturing local object motion from each burst dataset in a static scene using the synthetic stop motion, the capturing the local object motion comprising:

capturing an input and ground truth scene with a background scene;

capturing an input and ground truth scene with a foreground object;

cropping out the foreground object;

creating synthetic scenes by positioning the foreground object at different locations of the background scene; and simulating a motion blur for each local object motion by averaging a pre-defined number of frames of the burst dataset.

13. The method of claim 10, wherein the performing the Siamese training of the neural network comprises:

passing the at least two sets of frames with the different noise realizations to the neural network to generate at least two sets of output frames;

computing a Siamese loss by computing a loss between the at least two sets of output frames;

computing a pixel loss by computing an average of the at least two sets of output frames and a ground truth;

computing a total loss using the Siamese loss and the pixel loss; and training the neural network using the computed total loss.

14. An electronic device comprising:

at least one processor; and a memory configured to store instructions which, when executed by the at least one processor, cause the electronic device to:

receive a media stream;

perform an alignment of a plurality of frames of the media stream;

correct a brightness of the plurality of frames;

select one of a first neural network, a second neural network, or a third neural network, by analyzing parameters of the plurality of frames having the corrected brightness, wherein the parameters indicate whether artificial light flickering is present in the plurality of frames; and generate an output media stream by processing the plurality of frames of the media stream using the selected one of the first neural network, the second neural network, or the third neural network, wherein at least one of the first neural network, the second neural network and the third neural network is trained based on a dataset, and wherein the dataset is obtained by:

capturing burst datasets, wherein each burst dataset comprises at least one of low light static media with noise inputs and a clean ground truth frame;

simulating a global motion of each burst dataset using synthetic trajectory generation, and simulating a local motion of each burst dataset using a synthetic stop motion;

removing at least one burst dataset with structural and brightness mismatches between the clean ground truth frame and the low light static media; and creating the dataset by including the at least one burst dataset that does not include the structural and brightness mismatches between the clean ground truth frame and the low light static media.

15. The method of claim 1, further comprising determining whether the artificial light flickering is present in the plurality of frames, wherein the selecting of the one of the first neural network, the second neural network, or the third neural network is performed based on a result of the determining.

* * * * *